(12) United States Patent
Stainner

(10) Patent No.: US 12,031,999 B2
(45) Date of Patent: Jul. 9, 2024

(54) AIR VELOCITY MEASURING DEVICE

(71) Applicant: James Stainner, Tewksbury, NJ (US)

(72) Inventor: James Stainner, Tewksbury, NJ (US)

(*) Notice: Subject to any disclaimer, the term of this patent is extended or adjusted under 35 U.S.C. 154(b) by 0 days.

(21) Appl. No.: 18/367,248

(22) Filed: Sep. 12, 2023

(65) Prior Publication Data

US 2024/0175892 A1 May 30, 2024

Related U.S. Application Data

(63) Continuation of application No. 18/071,561, filed on Nov. 29, 2022, now Pat. No. 11,754,585.

(51) Int. Cl.
| | | |
|---|---|---|
| *G01P 5/00* | (2006.01) | |
| *G01P 1/02* | (2006.01) | |
| *G01P 1/04* | (2006.01) | |

(52) U.S. Cl.
CPC .............. *G01P 5/001* (2013.01); *G01P 1/026* (2013.01); *G01P 1/04* (2013.01)

(58) Field of Classification Search
CPC .. G01P 5/001; G01P 1/026; G01P 1/04; G01F 1/00
USPC ............................................... 73/168, 170.01
See application file for complete search history.

(56) References Cited

U.S. PATENT DOCUMENTS

| | | | | |
|---|---|---|---|---|
| 3,685,355 A * | 8/1972 | DeBaun | .................... | G01F 1/40 |
| | | | | 73/861.66 |
| 3,733,900 A * | 5/1973 | De Baun | .................... | G01F 1/40 |
| | | | | 73/861.66 |
| 3,748,901 A * | 7/1973 | DeBaun | .................... | G01P 5/16 |
| | | | | 73/861.66 |
| 4,453,419 A * | 6/1984 | Engelke | .................... | G01F 1/46 |
| | | | | 73/861.66 |
| 4,481,829 A * | 11/1984 | Shortridge | ................ | G01F 1/46 |
| | | | | 73/861.66 |
| 4,912,973 A * | 4/1990 | Milewski | .................. | G01F 1/46 |
| | | | | 73/861.66 |
| 6,439,061 B1 * | 8/2002 | Nelson | ....................... | G01F 1/46 |
| | | | | 73/861.65 |
| 8,186,230 B1 * | 5/2012 | Kelley | ....................... | G01F 1/42 |
| | | | | 73/861.42 |
| 10,001,151 B2 * | 6/2018 | Moss | ....................... | F24F 13/06 |

* cited by examiner

*Primary Examiner* — Nathaniel T Woodward
(74) *Attorney, Agent, or Firm* — Norris McLaughlin PA

(57) ABSTRACT

A fluid-flow measuring apparatus is made of an enclosure housing that supports a plurality of flow-receiving tubes, each one of which has a plurality of apertures the either face substantially towards the source of fluid flow or away therefrom, a dispersing blade with a surface located in a plane that is parallel to a plane that is tangent to the surface of at least one of the plurality of flow-receiving tubes, a hub intersecting at least one of the plurality of flow-receiving tubes, and a facilitator structure that separates at least two of the plurality of flow-receiving tubes.

20 Claims, 15 Drawing Sheets

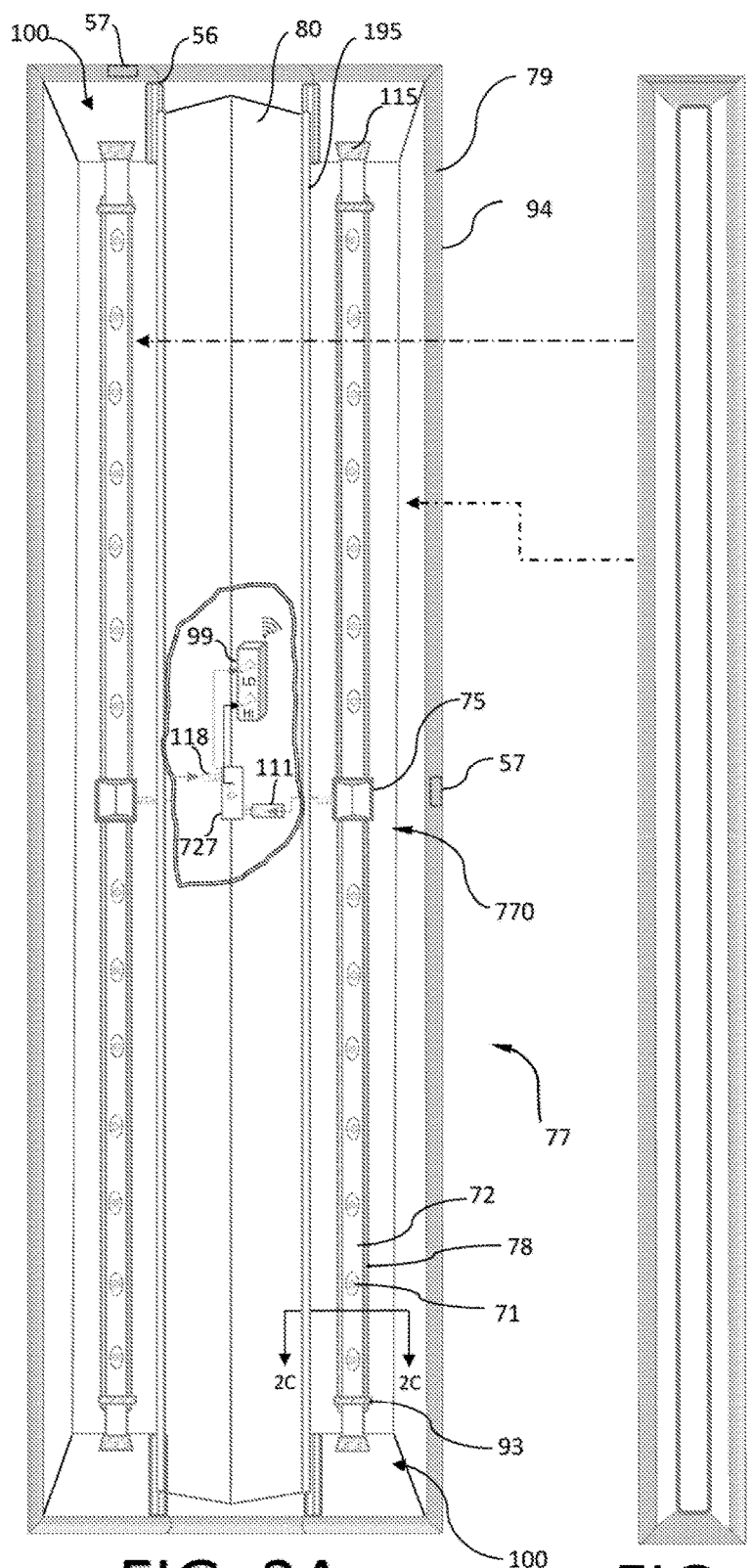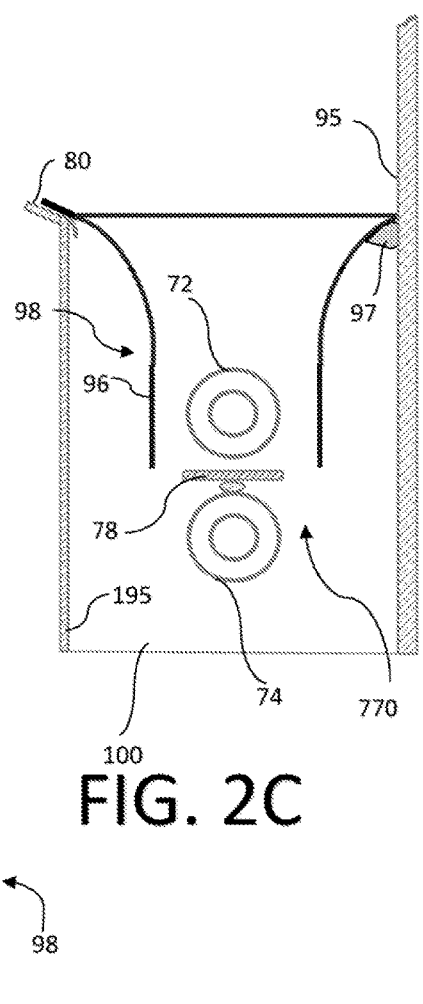
FIG. 2A  FIG. 2B  FIG. 2C

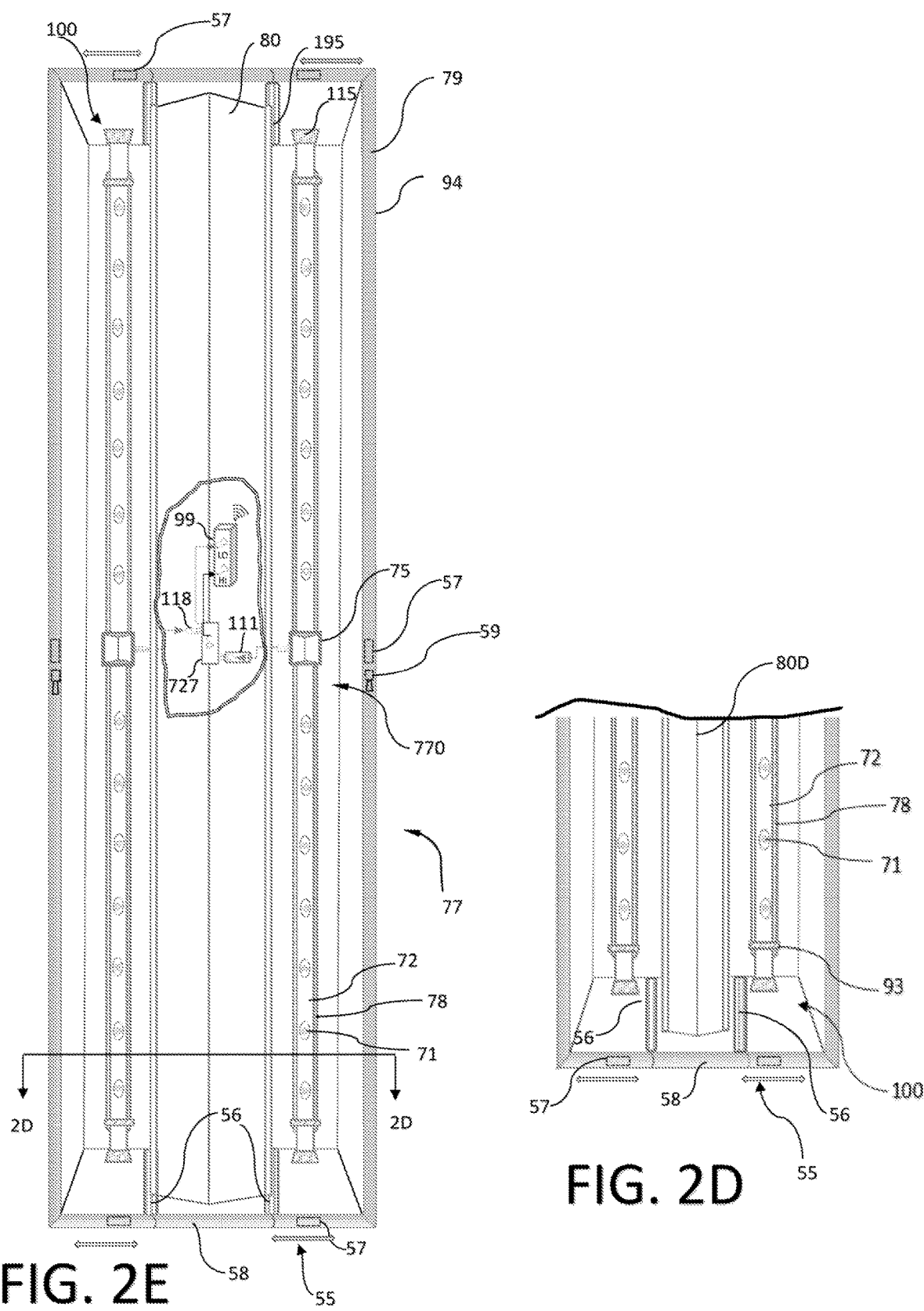

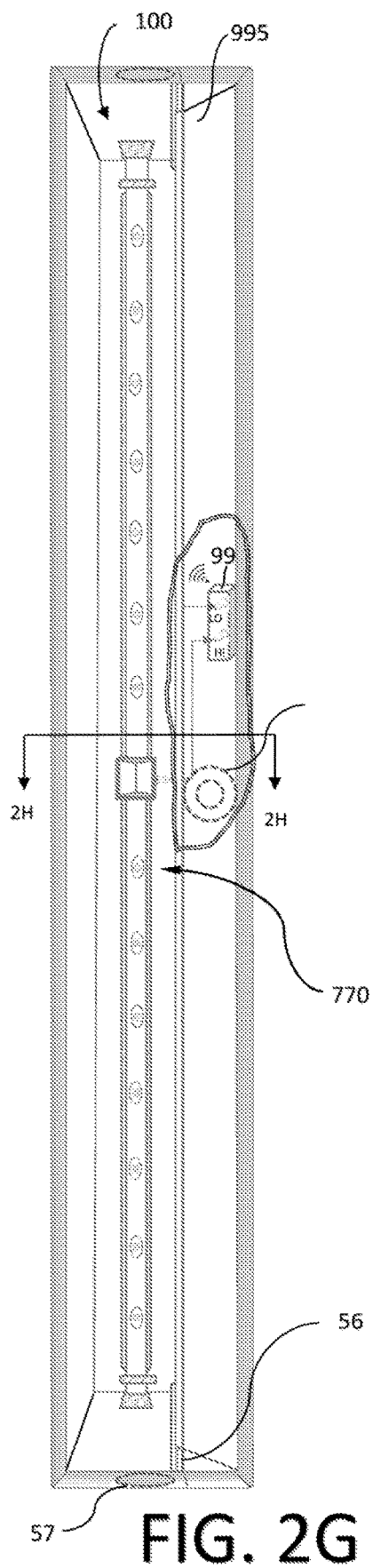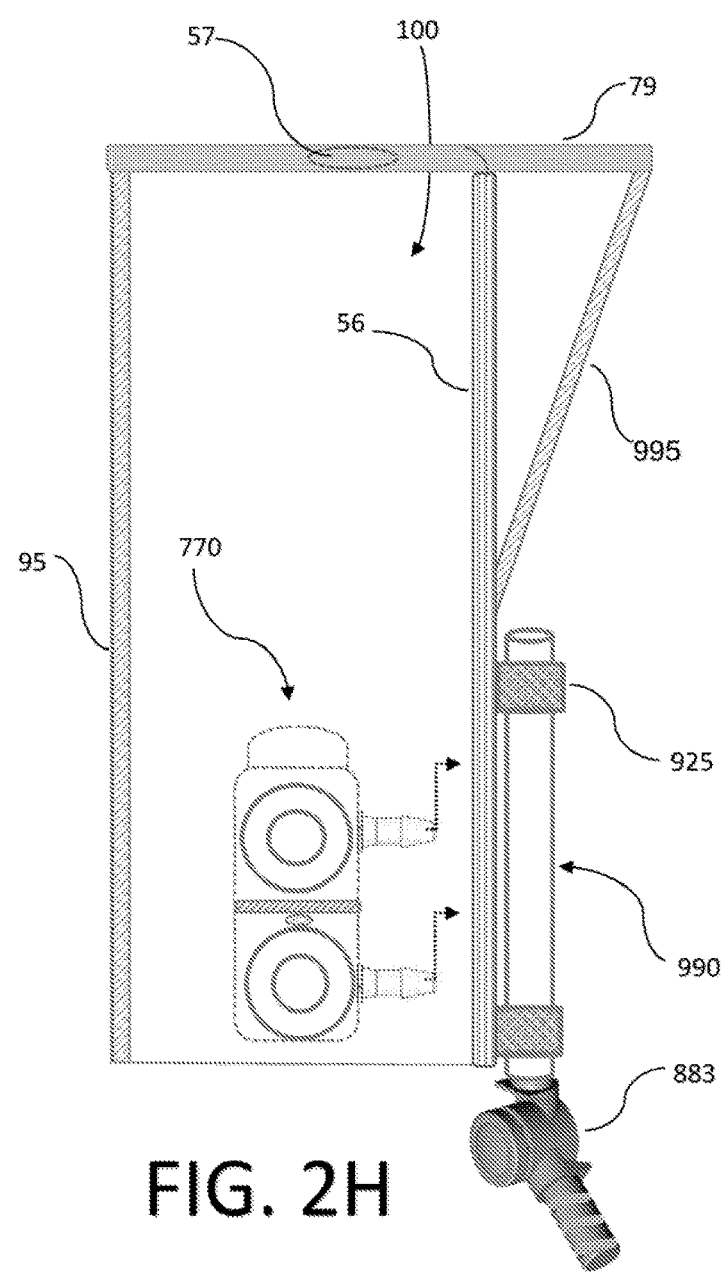
FIG. 2G
FIG. 2H

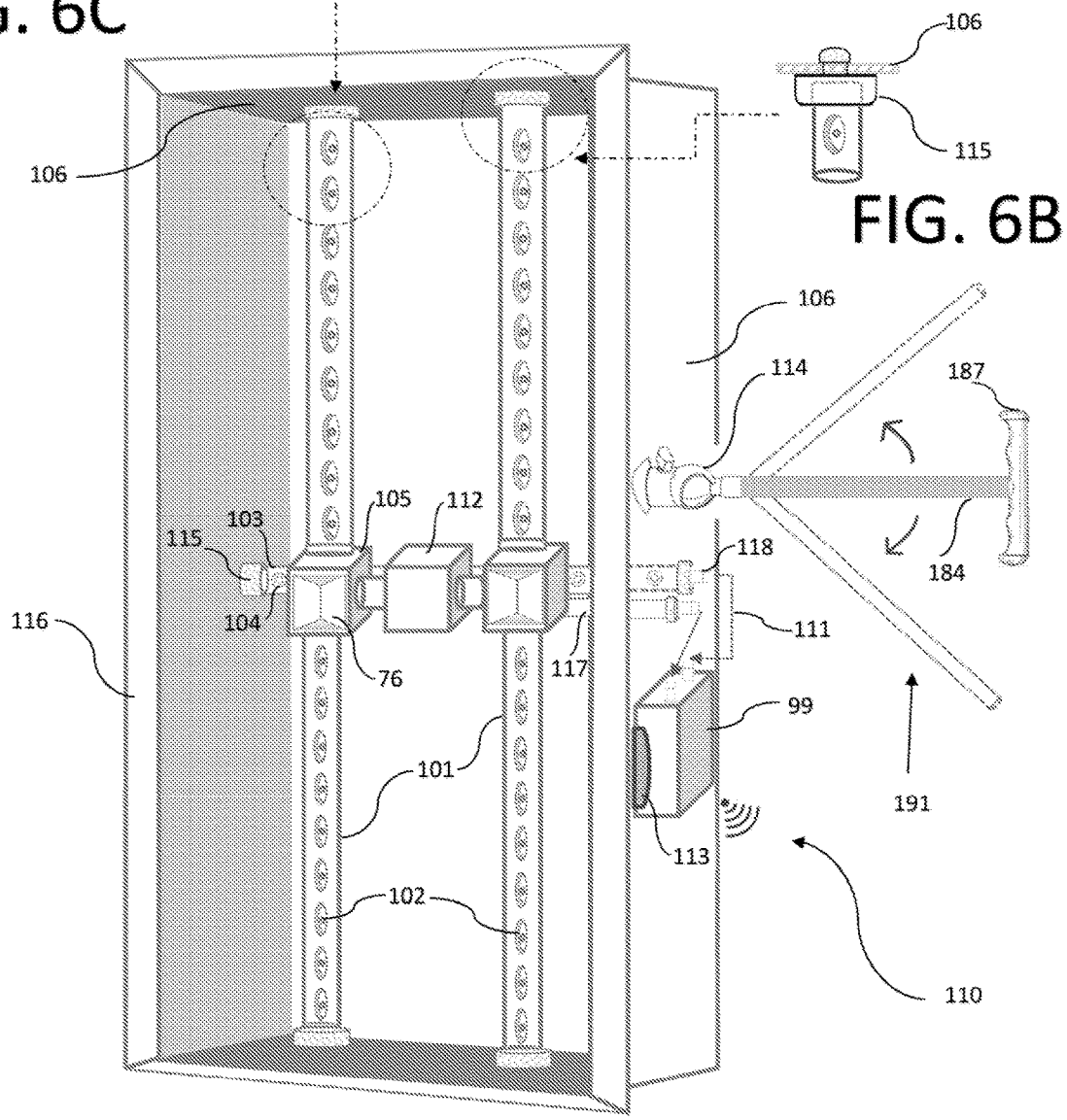

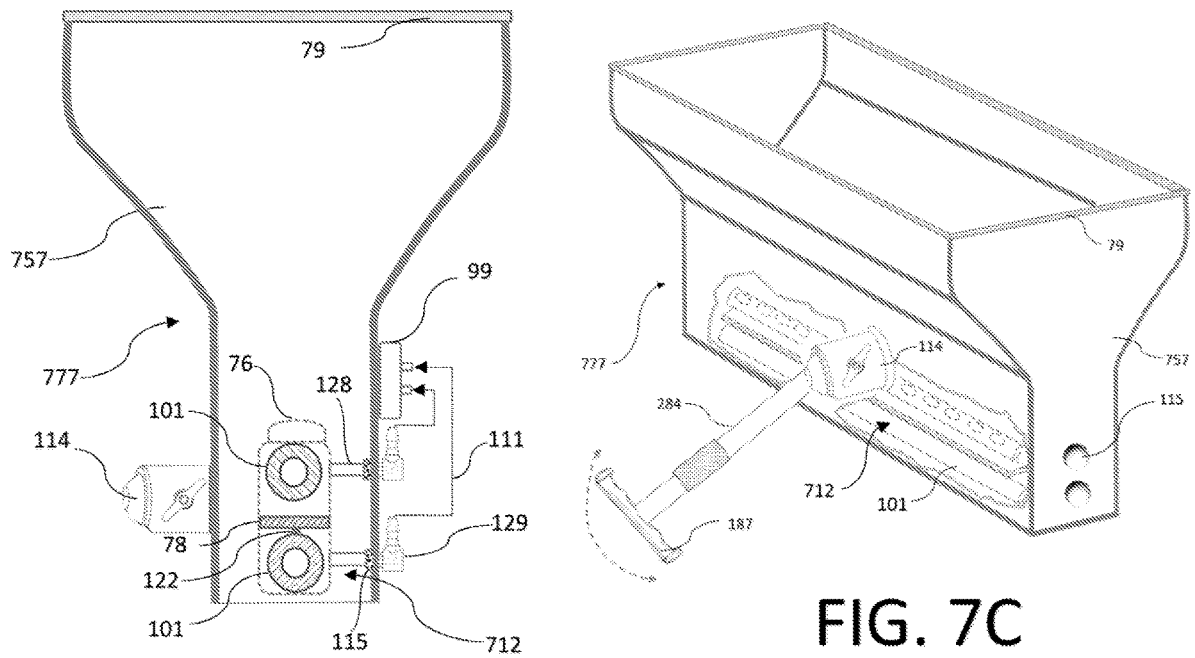
FIG. 7A
FIG. 7C
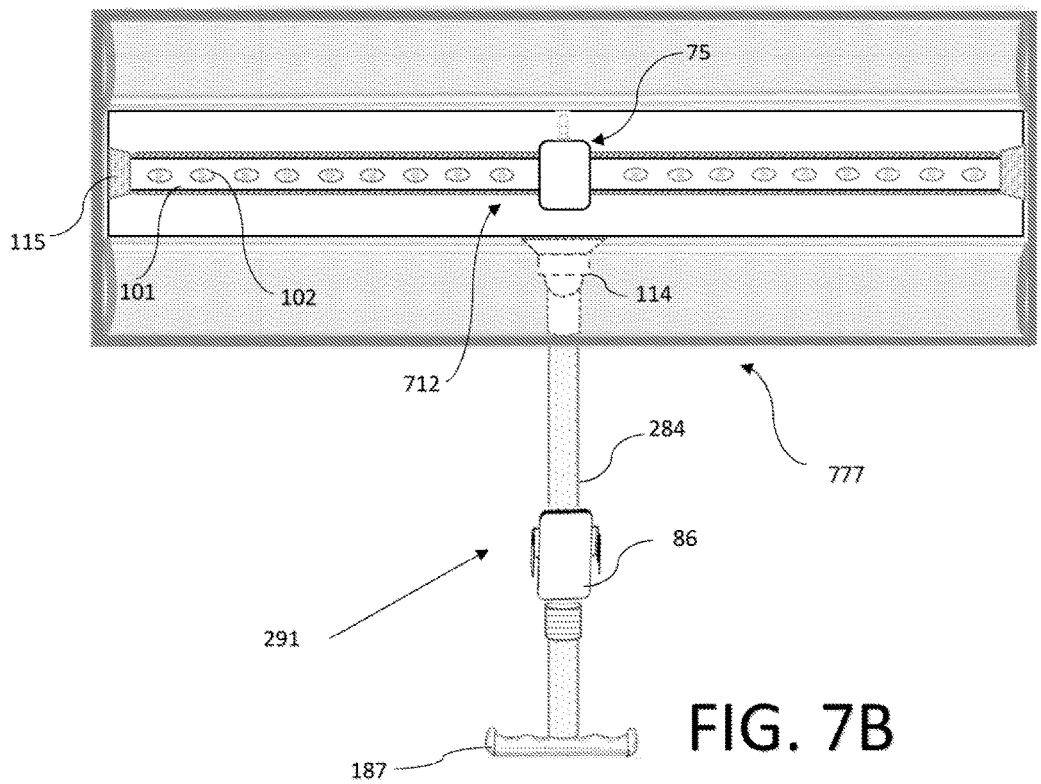
FIG. 7B

AIR VELOCITY MEASURING DEVICE

This application is a continuation of U.S. patent application Ser. No. 18/071,561, filed on Nov. 29, 2022, now U.S. Pat. No. 11,754,585, the entire disclosures of which being incorporated herein by reference in their entirety.

FIELD OF THE INVENTION

The present invention relates to the field of measuring air velocity from a portable pitot array velocity measuring apparatus, including those used in residential, commercial, and other applications.

SUMMARY

An exemplary fluid velocity instrument system may be a portable hand-held wireless apparatus which uses a plurality of velocity sensing manifolds to measure discharge or extracted velocity from orifices and flowing fluid sources. The sensed average velocity signals may be sent to a differential pressure transducer and transmitter to a mobile device.

An exemplary self-supported telescopic pole and articulating arm assembly coupled to an exemplary fluid velocity instrument system may afford hands-free operation or enable manual maneuvering around obstacles such as furniture and corners to position the apparatus adjacent flowing fluid sources easily and properly.

An exemplary portable velocity array station may be in a variety of shapes, such as rectangles or squares, and be used to measure intake orifices such as laboratory fume hoods and outside air intakes found on air handling units and be properly positioned to take accurate and quantifiable measurements. In an exemplary operation, In instances when ultra-low velocity measurements may be taken, the exemplary portable velocity array station may utilize a conical shaped facilitator to use nozzle effects to measure the flowing fluid source.

An exemplary fluid-flow measuring apparatus may comprise an enclosure housing, a plurality of flow-receiving tubes supported by a portion of the enclosure housing, wherein each of the plurality of flow-receiving tubes comprises either a plurality of apertures facing substantially towards the source of fluid flow or a plurality of apertures facing substantially away from the source of fluid flow, a dispersing blade with a surface located in a plane that is parallel to a plane that is tangent to the surface of at least one of the plurality of flow-receiving tubes, and a hub intersecting at least one of the plurality of flow-receiving tubes. The apparatus further comprises a facilitator structure comprised of a non-flat section interconnecting a first portion of the enclosure housing to a second portion of the enclosure housing opposite the first portion, and two walls extending downwardly from the non-flat section, wherein at least two of the plurality of flow-receiving tubes is separated by the facilitator structure.

In addition to the previously described embodiment and/or as an alternative to any other previously described exemplary embodiment, the apparatus may further comprise at least one flow-receiving tube with a plurality of apertures facing substantially towards the source of fluid flow and at least one flow receiving tube with a plurality of apertures facing substantially away from the source of fluid flow.

In addition to the previously described embodiment and/or as an alternative to any other previously described exemplary embodiments, the apparatus may be further configured so that the dispersing blade separates the flow-receiving tube with a plurality of apertures facing substantially towards the source of fluid flow from the flow receiving tube with a plurality of apertures facing substantially away from the source of fluid flow.

In addition to the previously described embodiment and/or as an alternative to any other previously described exemplary embodiments, the apparatus may further comprise a pair of flow-receiving tubes with a plurality of apertures facing substantially towards the source of fluid flow and a pair of flow receiving tubes with a plurality of apertures facing substantially away from the source of fluid flow, wherein each flow-receiving tube in each pair is separated from the other via the facilitator.

In addition to the previously described embodiment and/or as an alternative to any other previously described exemplary embodiments, the apparatus may further comprise a dispersing blade on either side of the facilitator, wherein each dispersing blade separates the flow-receiving tube with a plurality of apertures facing substantially towards the source of fluid flow from the flow receiving tube with a plurality of apertures facing substantially away from the source of fluid flow.

In addition to the previously described embodiment and/or as an alternative to any other previously described exemplary embodiments, the apparatus may be further configured so that the hub intersects both of the flow-receiving tubes with a plurality of apertures facing substantially towards the source of fluid flow and the flow-receiving tube with a plurality of apertures facing substantially away from the source of fluid flow.

In addition to the previously described embodiment and/or as an alternative to any other previously described exemplary embodiments, the apparatus may be further configured so that the hub intersects one of the pairs of flow-receiving tubes and another hub intersects the other pair of flow-receiving tubes.

In addition to the previously described embodiment and/or as an alternative to any other previously described exemplary embodiments, the apparatus may further comprise a flow leveling section disposed under the non-flat section of the facilitator structure for receiving flow from the plurality of flow-receiving tubes.

In addition to the previously described embodiment and/or as an alternative to any other previously described exemplary embodiments, the apparatus may be further configured so that the flow leveling section comprises a transducer, a transmitter and at least one flow reception nozzle coupled to the hub.

In addition to the previously described embodiment and/or as an alternative to any other previously described exemplary embodiments, the apparatus may be further configured so that the enclosure housing has a shape that does not have all equal sides.

In addition to the previously described embodiment and/or as an alternative to any other previously described exemplary embodiments, the apparatus may be further configured so that the enclosure is foldable along a pair of its sides.

In addition to the previously described embodiment and/or as an alternative to any other previously described exemplary embodiments, the apparatus may further comprise a converging nozzle disposed above at least one of the plurality of flow-receiving tubes.

In addition to the previously described embodiment and/or as an alternative to any other previously described exemplary embodiments, the apparatus may be further configured so that the apertures are oriented along the length of at least one of the plurality of flow-receiving tubes by non-equal spacing.

In addition to the previously described embodiment and/or as an alternative to any other previously described exemplary embodiments, the apparatus may be further configured so that the apertures are more closely spaced along the length of at least one of the plurality of flow-receiving tubes at a location distal from the point of intersection with the hub.

In addition to the previously described embodiment and/or as an alternative to any other previously described exemplary embodiments, the apparatus may further comprise a covering overlapped with a flow-receiving tube, wherein the covering is configured to partially cover at least one of the plurality of apertures along the length of that flow-receiving tube.

In addition to the previously described embodiment and/or as an alternative to any other previously described exemplary embodiments, the apparatus may further comprise a covering overlapped with a flow-receiving tube, wherein the covering is configured to completely cover at least one of the plurality of apertures along the length of that flow-receiving tube.

In addition to the previously described embodiment and/or as an alternative to any other previously described exemplary embodiments, the apparatus may further comprise a gasket coupled to the enclosure housing for substantially sealing fluid flowing through the enclosure housing.

In addition to the previously described embodiment and/or as an alternative to any other previously described exemplary embodiments, the apparatus may be further configured so that one of the gasket or the enclosure comprises means for detachably engaging the source of fluid flow or an adjacent surface while providing the substantial seal.

In addition to the previously described embodiment and/or as an alternative to any other previously described exemplary embodiments, the apparatus may further comprise an arm detachably connected to the enclosure housing.

DESCRIPTION OF THE DRAWINGS

FIG. 2A illustrates a top view of the portable air velocity measuring device of FIG. 1.

FIG. 2B illustrates the top view of the portable air velocity measuring device of FIG. 1.

FIG. 2C further illustrates the section view of the portable air velocity measuring device of FIGS. 1 and 2A.

FIG. 2D illustrates another exemplary view of the portable air velocity measuring device according to one aspect of the invention disclosed herein.

FIG. 2E illustrates a different exemplary view of the portable air velocity measuring device of FIG. 2D.

FIG. 2G illustrates another exemplary embodiment of the portable air velocity measuring device according to another aspect of the invention disclosed herein.

FIG. 2H illustrates an exemplary profile view of the exemplary portable air velocity measuring device of FIG. 2G.

FIG. 6A illustrates a perspective view of an exemplary embodiment of a portable or hand-held free-space velocity measuring station according to one exemplary embodiment of the invention disclosed herein.

FIG. 6B illustrates an exploded side view of an exemplary rubber grommet sleeve according to one exemplary embodiment of the invention disclosed herein.

FIG. 6C illustrates an exploded side and top view of an exemplary blank-off plate according to one exemplary embodiment of the invention disclosed herein.

FIG. 7A illustrates an transparent side view of an exemplary compact hand-held conical velocity measuring apparatus according to one exemplary embodiment of the invention disclosed herein.

FIG. 7B illustrates a top view of the exemplary compact hand-held conical velocity measuring apparatus of FIG. 7A.

FIG. 7C illustrates a perspective view of the exemplary compact hand-held conical velocity measuring apparatus of FIG. 7A.

Figure 1:
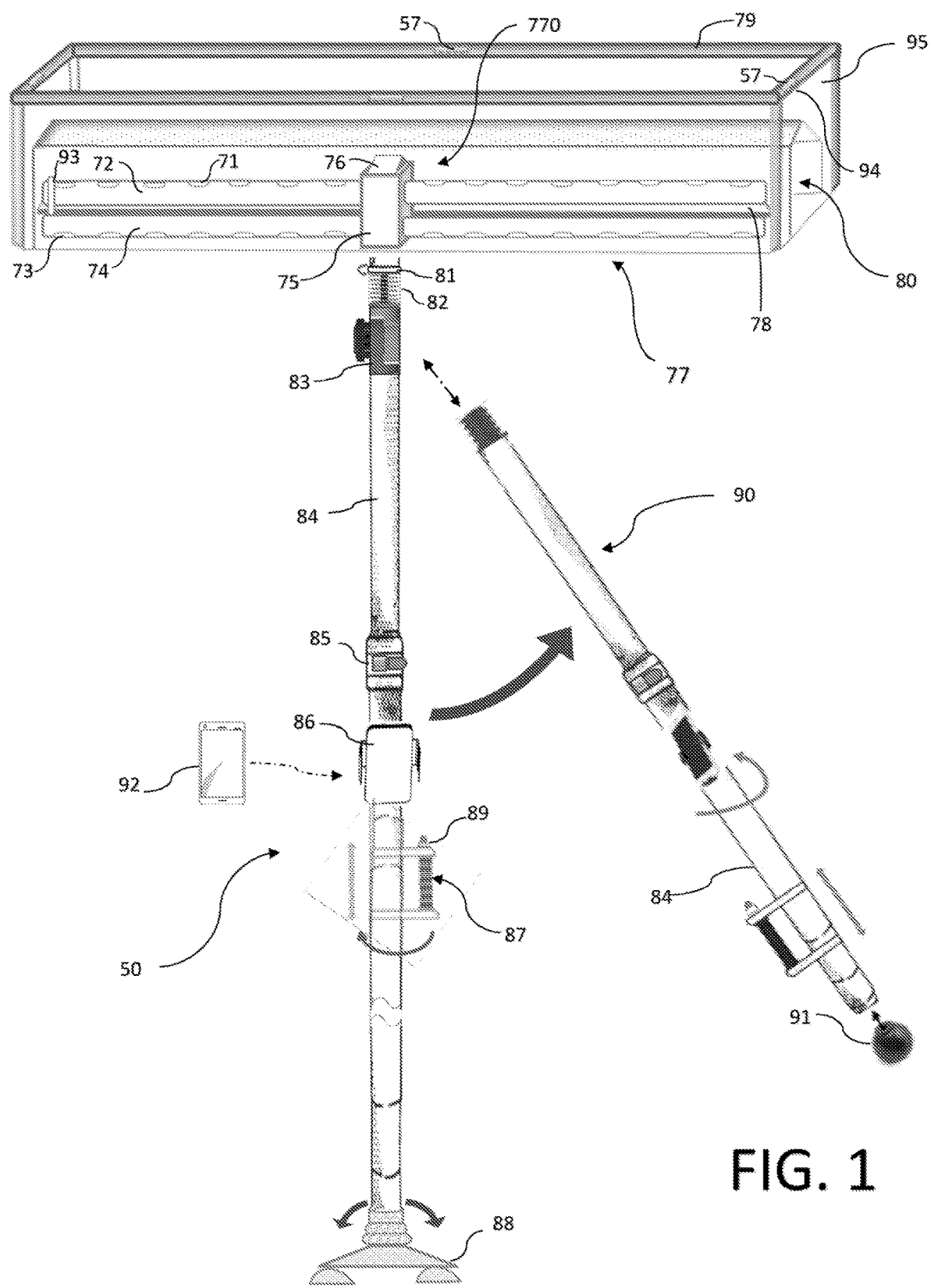
FIG. 1 illustrates an exemplary portable air velocity measuring device according to one exemplary embodiment of the invention disclosed herein.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

With reference to the illustrative embodiment described herein and illustrated in FIG. 1, an exemplary portable air velocity measuring device 77 may comprise a housing 70 made up of a plurality of flanges 94 via which a plurality of walls 95 are held together, each of which being supported by a facilitator structure 80. Additionally, an exemplary velocity measuring device 77 may have an extendable pole 50 that couples to the facilitator structure 80 of velocity measuring device 77 via a coupling (e.g., collar 81). As illustrated, an exemplary measuring velocity measuring device 77 may be either handheld via pole 50 and/or be controlled using a manipulator 90, which may be handheld. In an exemplary embodiment, pole 50 may attach to an underside wall 95 of the velocity facilitator structure 80, which according to an exemplary embodiment may have a novel rectangular shape. In a first aspect of an exemplary embodiment of the invention, the novel rectangular shape of velocity measuring device 77 may provide for a low-profile and mass. In a second aspect of an exemplary embodiment of the invention, the novel rectangular shape of velocity measuring device 77 may enable parallel bidirectional pitot array velocity measuring manifold assemblies 770, which in one variation may be disposed on opposite sides of the facilitator structure 80. In another variation, these assemblies 770 may be orthogonal or at any other angle with respect to one another based on needs.

Figure 10A:
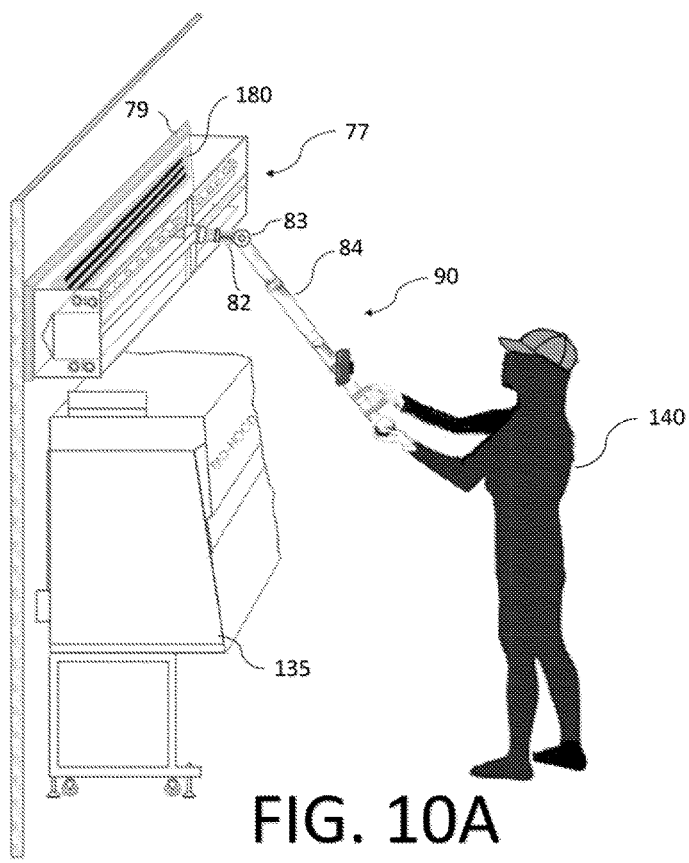
FIG. 10A illustrates an exemplary application of use of an exemplary sectional portable air velocity measuring device.

In accordance with a preferred embodiment, a rectangular-shaped measurement velocity measuring device 77 may be disposed over a linear or rectangular shaped air devise or aperture and thereby be able to make precise and repeatable velocity measurements of the air volume traveling out of the conduit. In exemplary aspect, which relates to the aforementioned preferred embodiment as well as others disclosed herein, the velocity measuring device 77 may receive incoming air from the conduit in such a way that it is distributed relatively equally and unobstructed into each collection channel. Accordingly, the center discharge velocity of fluid (e.g., air) from the conduit may be proportionally distributed over a domed surface of facilitator structure 80 so that the discharge velocity (e.g., the air flow(s)) may be received at each collection channel 100. The arm 50 affords a technician the ability to take measurements without the strain or fatigue often encountered when holding a test apparatus overhead or in a non-ergonomic posture. When an air devised is disposed overhead at a high-level or on a side wall as illustrated in FIG. 10A, the telescopic poles of the arm 50 may be extended so the technician will not need to stand on a ladder. Additionally, not having to maneuver and set up a ladder could substantially reduce time and reduce the potential for errors in measurements when standing on a ladder in an awkward posture.

FIG. 1 further illustrating a perspective view of a stand-alone telescoping support assembly which may be referred to as a pole caddy or arm 50 may comprising of a plurality of cylindrical tubular shaped aluminum or fiberglass telescoping poles 84 which use a cam-snap-locking mechanism 85 to secure each pole when extended. An exemplary arm 50 may also be a rigid device that does not telescope, but may otherwise fold, detach, or transform from one configuration to another. The same capabilities may be applied to the exemplary arm 90 illustrated. In a preferred embodiment arms 50 or 90 may be used with a velocity measuring device 77 or similar apparatus disclosed herein, e.g., apparatus 70 of FIG. 3. Arm 50/90 may comprise a ratcheting collar 81 coupled to the pole 84 for minor horizontal rotation when positioning of the velocity measuring device 77 evenly over an air devise or aperture and wherein, not having to stand in an awkward or nonergonomic position. A light duty compression spring assembly 82 may be used to secure the velocity measuring device 77 against an acoustical type T-Bar ceiling or wall ensuring a tight seal around the air devise. The light duty compression spring assembly 82 further acts as a cushion between the floor and ceiling when using the stationary self-supporting arm 50. There may be articulating mount 83, which may comprise an adjustable locking hinge that may oscillate in minor increments to provide positive positioning over an air devise or aperture. The articulating mount 83 may afford the technician the ability to maneuver the velocity measuring device 77 or 70 around or above fixed obstructions without compromising measurements. While arms 50 and/or 90 may be illustratively shown in the figures, the person of ordinary skill in the art would understand these assemblies to comprise as many or sufficient number of parts, components, and capabilities to allow for lifting, moving, positioning, analyzing, carrying, or otherwise enabling the operation of an exemplary velocity measuring device 77 as disclosed herein.

A wireless (transceiver) communication devise 92 may be a smart phone, laptop, or built-in display panel, configured to be disposed on a cradle or support surface 86 on one or more of arms 50 and/or 90. In a preferred embodiment, device 92 may be securely attachable and placed anywhere along the pole 84 for hands-free and ease in activating measurement sequencing and viewing readings without strain.

In another exemplary embodiment, an ergonomic handle with a rubber type grip 87 may be attached to the pole 84 for comfort when positioning the measuring apparatus or when maneuvering and holding the portable pole caddy 90. Alternatively, an ergonomic horizontal sash type handle may be disposed and secured to the telescopic pole 84. There may be a wireless remote button 89 which may be attached to the handle 87 to activate the communication with the wireless differential pressure (DP) transmitter 99 (as may be seen in the illustrative embodiment of FIG. 2A). An exemplary wireless differential pressure (DP) transmitter 99 may be secured to a facilitator structure 80 with a hook-and-loop type fastener so it may be easily removed and disposed on any of the other velocity measuring device 77 embodiments. Utilizing a single DP transmitter on a plurality of apparatuses eliminated any error otherwise could occur when having to use an array of measurement instrumentation. When repeatability and quantifiable measurements are paramount in the validation process of a facility, utilizing the same wireless pressure transmitter on a plurality of embodiments may be preferable when stakeholders and/or technician(s) request a higher level of confidence in fluid flow readings.

When the wireless button 89 may be disposed on the handle 87 of the arm 90 it affords the technician the mobility to move about a facility taking a plurality of readings without having to remove their hands from the pole caddy 90. In a preferred embodiment, an exemplary portable telescopic arm 90 may have a foam rubber comfort ball 91 attached to the end of the pole 84 for ease when maneuvering and holding the velocity measuring apparatus 70 or 77 over a flowing fluid source, such as, for example a ventilation system, air ducts, air conditioning units, HVAC returns, and other sources of flowing fluids known to those skilled in the art.

A floor base 88 may have a sleeve that oscillates and/or a plurality of non-slip gripping feet at the bottom end of the pole 84 for stand-alone use that may provide sturdy and stable positioning to the floor or other applicable surface. An exemplary base 88 may further allow the velocity measuring device 77 to be secured to a flowing fluid source (not shown) that may be disposed in a ceiling where the floor below may be not level, such as a sloping theatre floor. Alternatively, base 88 may be configured to adapt to any surface where it may find use, e.g., an adhesive surface for use on glass, wood, marble, etc. or a magnetic surface for industrial sites. Further alternatively, base 88 may also be adapted to connect to other systems to increase utility, such as, for example, moveable platforms to navigate people or areas in which a measurement needs to take place, ladders, or stepstools. An exemplar arm 50/90 may further reduce the risk of injury from awkward body postures as delineated by the Occupational Safety and Health Administration (OSHA) for the Prevention of Musculoskeletal Disorders in the Workplace. An exemplary arm 50 when attached to apparatus 70 or 77 may work autonomously while the technician may be in another location making velocity adjustments via a volume damper known to those skilled in the art and may be able to activate the wireless differential pressure (DP) transmitter 99 from a mobile transceiver device (e.g., device 92), which may expedite the adjustment process in a time and effort saving manner.

FIG. 1 further illustrates a transparent perspective view of a novel rectangular embodiment of a velocity measuring device 77. According to this illustrative embodiment, velocity measuring device 77 may comprise a flange 94 around the top perimeter of the velocity measuring device 77 to provide a rigid and substantially air-tight coupling between the velocity measuring device 77 and the flowing fluid source to be measured (not shown). In a first embodiment, velocity measuring device 77 may comprise walls 95 and a foam rubber type gasket 79 disposed on top of the flange 94 wherein the gasketing provides a tight seal around the flowing fluid source 77 to enable accurate flow measurements. In a preferred embodiment, walls 95 and velocity facilitator structure 80 may be made of lightweight, rigid high impact polystyrene or similarly slippery UHMW polyethylene material having a low-friction interior surface and having a low Reynolds Number (Re) to minimize the boundary layer, fluid velocity fluttering, and/or maintain a homogenized profile, which in accordance with the disclosures herein, may include a uniform laminar flow characteristic, as the fluid's velocity converges on the bidirectional pitot array velocity sensing manifold assembly 770. In another exemplary embodiment, facilitator structure 80 may have an elongated dome having a slight curvature at the apex to proportionally distribute the velocity from the center of the flowing fluid source or a 0° deflection aperture to each collection channel 100 further maintaining an unrestricted and uniformed distribution of velocity across the bidirectional pitot array velocity sensing manifold assembly 770. Each pitot array velocity sensing manifold assembly 770 may be disposed adjacent to or most proximal to a collection channel 100, as may be illustratively provided for in FIG. 2A.

In an exemplary embodiment a mean diverting chamber hub 75 may be disposed below a diverting dome 76 having a slight curvature at the apex to prevent any swirling or turbulent fluid condition from occurring at exemplary total pressure sensing ports 71. While diverting dome 76 may be shown as being prismatic and triangular in cross-section, an exemplary diverting dome 76 may be any type of polyhedron or combination of polyhedral whose geometry achieves the desired aspects of the disclosures herein.

In another exemplary embodiment, the ends of each total pressure sensing tube elements 72 may be stabilized using a grommet type bracket 93, which in one aspect of this exemplary embodiment, may be slid over sensing tube 72 and clipped onto a dispersing blade 78. The depth of the velocity measuring device 77 may be proportional to the width to sense a relatively laminar velocity across the bidirectional pitot array sensing ports of the manifold 770.

FIG. 2A illustrates a top view of an exemplary rectangular-shaped velocity measuring device 77. The velocity measuring device 77 may measure both discharge and extracted velocity, wherein the preferred use of the apparatus may be in measuring the discharge velocity from a linear or bar type flowing fluid source 180 as illustrated in FIG. 10A. The two bidirectional pitot array velocity sensing manifolds 770 may be disposed on the elongated sides lengthwise and parallel to the facilitator structure 80. An exemplary dome (which may be triangular shaped) disposed above the facilitator structure 80 may smoothly divert any center discharge velocity proportionally and unobstructed into each collection channel 100 to produce a precise and repeatable measurements without any hinderance that could create turbulence at the bidirectional pitot array velocity sensing manifolds 770.

In an exemplary embodiment, each collection channel 100 may be sized to collect a proportional ratio of the velocity discharged or extracted from a flowing fluid source. Thus, a shaped dome disposed between both collection channels 100 may advantageously distribute any incoming fluid flows/discharge velocities from the center of a flowing fluid source. Those skilled in the art would recognize at least one advantage in this particular embodiment, namely, the use of dome to divert what would normally be pure vertical or substantially vertical flow velocity vectors so that they are targeted towards a designated collection zone (channel(s) 100).

Referring now to the illustrative embodiment of FIG. 2C, an exemplary manifold system may be illustrated with a slight curvature of the facilitator dome 80 as it adjoins with the inner wall 195 of the housing 70, which is illustrated as having a substantially thin wall construction made of smooth surface plastic. Exemplary velocity sensing manifolds 770 may be disposed at the lower end of the collection channels 100 to ensure a fully developed and uniformed laminar condition as the velocity converges on the sensing elements 72/74. A rubber type bracketing 93 may be distal from the manifold disposed over the sensing element 72 and clipped onto a dispersing blade 78, a function of which may be to (i) prevent one or both elements 72/74 from pulsating when higher velocities may be present and/or (ii) stabilize the sensing element 72 when inserted in the aperture of the rubber fastening grommet 115, which in turn may be fastened to the perimeter wall 95. In another embodiment, which may be illustrated with respect to FIG. 2E, one or more magnets 57 may be disposed on all four perimeter walls and inside gasket 79 wherein the magnets 57 are sufficient in strength to support the weight of apparatus 77 without the necessity of an external support pole caddy to operate hands-free when apparatus 77 disposed over a linear type bar grille.

Referring back to the illustrative embodiment of FIG. 2A, an exemplary cutout view may illustrate the rubber or similar polyethylene type tubing 111 connected by barb fittings 118 used to transport the fluid communicating from each mean diverting hub 75 of the velocity sensing manifolds 770 to leveling hub 727 which then sends a single mean pressure to the wireless differential pressure (DP) transmitter 99. While only the total pressure (or also identified as the high side) leveling hub 727 may be illustrated communicating in this view, those skilled in the art and learning from this disclosure would understand that there may be also a static pressure (low side) leveling hub 727 that communicates to a wireless (DP) transmitter 99 wherein a transducer of the transmitter, which may be any transducer known to those skilled in the art, may convert the total (TP) and static pressure (SP) of the leveling hubs 727 to a single velocity pressure (VP) wherein, may be then converted to a electrical signal that may be then transmitted to a hand-held mobile device such as 92. Alternatively, a plurality of differential pressure transducers for each bidirectional pitot array velocity measuring manifold assembly 770 may be disposed in the wireless transmitter 99 and communicate collectively to a smart type mobile device 92.

Referring to the illustrative embodiment of FIG. 2B, a top view of exemplary low velocity plates 98 may be shown, in this embodiment, for a rectangular arrangement. In an exemplary embodiment, plates 98 may act as area-reducing surfaces that may be added when the discharge velocity from a flowing fluid source being sensed may be below the transducer's measuring range. This may be a condition that occurs when the aperture of the collection channels 100 may be larger than the (dynamic) total pressure sensing tube. Thus, the plates 98 may serve to amplify the incoming velocities so that they may register a reading of an otherwise low discharge velocity from the flowing fluid source. As shown diagrammatically between FIGS. 2A and 2B, dashed lines with arrows may illustrate that the low velocity plates 98 may be disposed on both collection channels 100 to equally proportion the velocities across the length of both bidirectional pitot array velocity sensing manifold 770. In an alternative embodiment, plates 98 may be adjustable or actuated to extend from the walls of the housing 77 depending on measurements attained at the channels 100, using, for example, linear actuators and other mechatronic components to cause parts to move into and out of spaces in the housing walls 95/195.

Referring to the illustrative embodiment of FIG. 2C, a side view of an exemplary converging nozzle 96 attachment may utilize similar aspects of a de Laval nozzle to cause an accelerated velocity over the total pressure sensing element 72. In this embodiment, a velocity plate 98 may be configured to have a slightly pitched flange that contours the pitch of the facilitator dome 80 on the inner wall 195 and a foam rubber gasket 97 that may be pressed up against the outer wall 95 of the collection channel 100, which in combination may result in a tight and secure seal. The low velocity plate 98 may have a tapering volute shape which may have a symmetrical reducing orifice ahead of the sensing manifold for quantifiable measurements of very low velocities, which may create a higher and/or more consistent velocity reading. In an exemplary embodiment, a software application stored in the transmitter 99 or other like circuitry used to provide output of the measurements obtained, may have a coefficient factor when the low velocity plate 98 may be disposed over the collection channels 100 of velocity measuring device 77. According to this illustrative embodiment, the throat of the nozzle may only extend to the amplification plate 78 wherein the low-pressure sensing tubes 74 may only sense the static pressure in the collection channel 100. As previously described, converging walls of the low-flow area reducing plate 98, otherwise known as venturi nozzles, may reduce instabilities sensed by the (dynamic) total pressure sensing ports 71.

Figure 3:
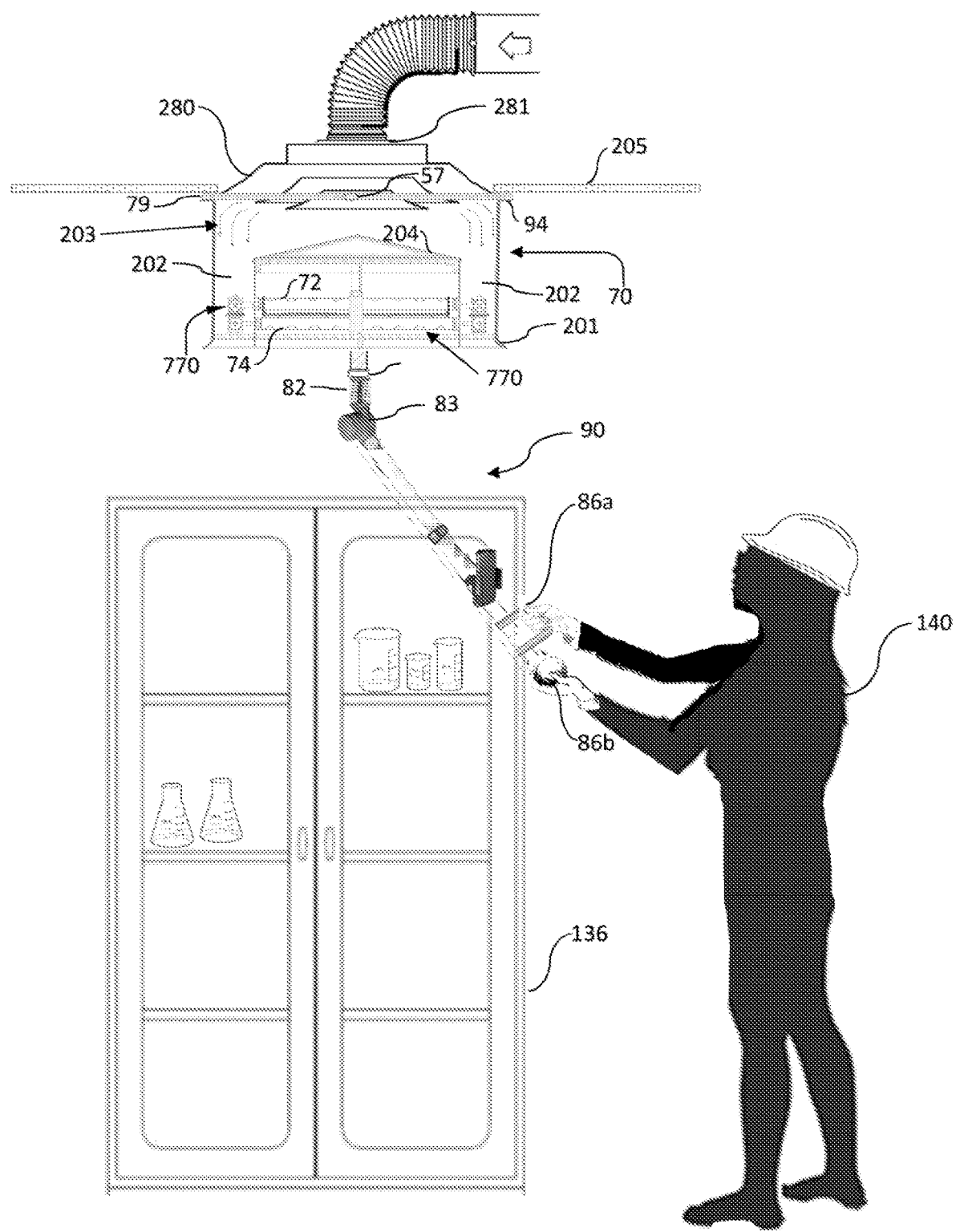
FIG. 3 illustrates an exemplary portable air velocity measuring device according to another exemplary embodiment of the invention disclosed herein.

Referring to the illustrative embodiment depicted by FIG. 3, an exemplary transparent orthogonal view of the exemplary measuring apparatus 70 may be shown having a substantially square shape being disposed beneath a flowing fluid source 280. While only illustrative, FIG. 3 may depict use of the disclosed device 70 in spaces such as laboratories and other industrial or research sites, although it is not limited to such areas. According to this illustrative embodiment, when the measuring apparatus 70 may be disposed over a relatively square-shaped flowing fluid source 280 in which the flowing fluid may have a 4-way directional velocity throw as illustrated by arrows 203, the velocity may be proportionally distributed to the collection channels 202 substantially unobstructed and/or substantially void of any restrictions in a relatively uniformed manner across each bidirectional pitot array velocity sensing manifold 770, which together may be used to obtain precise and repeatable measurements. The facilitator 204 of this embodiment may have a slight vertical profile dome proportionally distributes any velocity being discharged from the center of the flowing fluid source 280 onto the slightly curved apex of the facilitator dome to the collection channels in a laminar and uniformed manner. In an exemplary embodiment according to FIG. 3, each collection channel 202 may be identically sized in terms of cross-section and volume capacity to allow for the collection of a substantially equal and/or proportional ratio of the velocity discharged or extracted from flowing fluid source 280, which while illustrated as having a square cross-section, may be any geometry of equal sides or geometry having equal dimensions about a central point (e.g., a circle). In a further exemplary embodiment according to FIG. 3, each collection channel 202 may be sized to collect a proportional ratio of the velocity discharged or extracted from a flowing fluid source 280, as previously described. In a still further exemplary embodiment according to FIG. 3, an exemplary distribution dome 204, which may be triangular, pyramidal, frusto-pyramidal, and/or conical in shape, may be disposed between collection channels 202 arranged about the quadrilateral perimeter of device 70.

As illustratively depicted in FIG. 3, when a flowing fluid source 280 may be smaller or may have a 0° deflection throw pattern bar type grille, the facilitator dome 204 may assist in guiding the discharge velocity proportionally from the facilitators dome apex onto the collection channels 202 and 212 maintaining a relative laminar flow characteristic without the velocity fluttering or swirling in the upper chamber of the apparatus 70. Collection channel 202 and/or 212 may have substantially equally sized and relatively elongated and/or narrow conduits to further promote an induction type effect wherein any lingering velocity from the facilitator dome 204 converges linearly into the collection channel 202/212 free of any swirling or turbulence. The substantially smooth and unrestricted longitudinally conduit of the collection channel 202/212 may be used to obtain a fully developed laminar fluid state as it converges onto the total pressure sensing element 72 and without influencing the sensed static pressure of sensing element 74. The bidirectional pitot array velocity sensing manifold 770 may be disposed near the bottom of each collection channel 202/212 where the velocity profile may be substantially more uniformed. Each of the plurality of bidirectional pitot array velocity sensing manifolds 770 may have a substantial amount of sensing aperture 71 (see FIG. 4) to obtain a greater representation of the mean fluid velocity from a source (e.g., source 280). When an exemplary measuring apparatus 70 may be disposed to measure extracted velocity from a grille, the bidirectional pitot array velocity measuring manifold assembly 770 functions antithetically in that sensing element 74 may be used to measure the total pressure and sensing element 72 may be used to measure the static pressure inside the collection channel 202/212. The spacing between the sensing element 72/74 and an exemplary dispersing plate 78 may be only relevant when measuring discharge velocities from an upper chamber of the embodiment, e.g., a volume more proximal to dome 204 than to sensing element 72. An exemplary bell-mouth tapered flange 201 may also contribute to the production of a lower velocity inlet condition and a non-restrictive laminar convergence at the sensing element 74. Extracted air from a flowing fluid source may not produce any turbulent or swirling effect, in which case, this effect needs to be compensated for at the bidirectional pitot array velocity measuring manifold assembly 770 wherein the manifold may be disposed near the inlet of the measuring apparatus to minimize, and preferably, eliminate one or more adverse effects.

As illustratively depicted in FIG. 2D, a partial top view of apparatus 77 may be shown with an interchangeable diverting dome 80D, which as illustrated may be substantially narrower than the interchangeable diverting dome 80, to dispose apparatus 77 over a narrower type linear grille without the necessity of an alternate apparatus. Exemplary dome 80 and 80D may slip down into a retractable perimeter wall whereby dome 80D may be stored when retractable perimeter wall is slid into sleeve clip 56. With reference to the illustrative embodiment, arrow 55 may illustrate the retractable wall movement. The removal section of the gasketing 58 is equal to the length of the retractable wall to ensure smooth top when apparatus 77 is disposed over an air devise.

Figure 4:
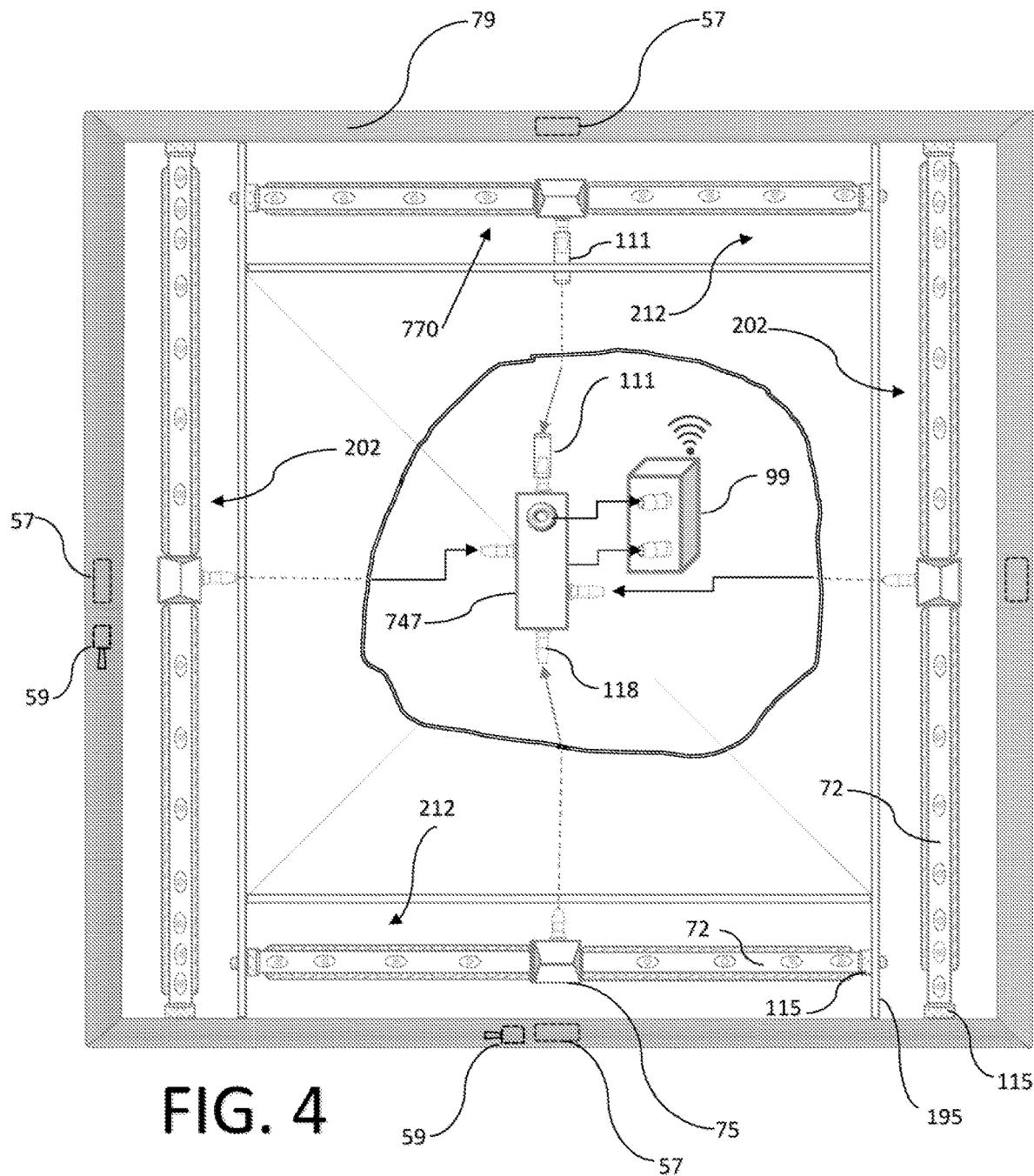
FIG. 4 illustrates a top view of the exemplary portable air velocity measuring device of FIG. 3.

FIG. 2E and FIG. 4 illustrates an exemplary embodiment of an end-switch 59 that may be added to any of the perimeter wall gasketing assemblies. An exemplary end switch 59 may communicate with a hand-held mobile smart device 92 when disposed over an air device and with the device 92, start and activate the flow and velocity measuring processes described herein. Again, magnets 57 may be disposed on any or all perimeter walls inside the rubber foam type gasketing to affect a magnetic hold of the apparatus to the source and otherwise suspend the device in hands-free use without the necessity of a pole or caddy.

Figure 2F:
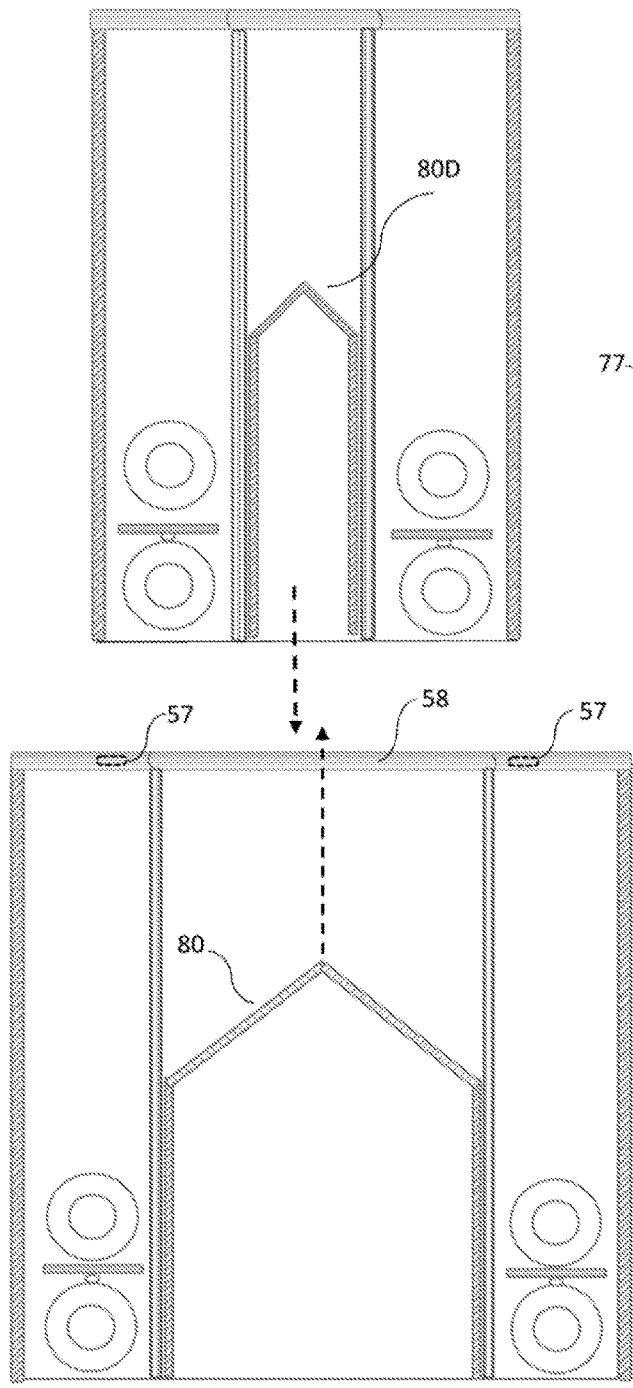
FIG. 2F illustrates an exemplary component interchangeability function applicable to the invention disclosed herein.

As illustratively depicted in FIG. 2F, an exemplary transparent view of apparatus 77 may be shown with an exemplary dome assembly 80 that may be slipped out and substantially narrower dome 80D may be dropped in place. Further illustrated is an exemplary gasketing section 58 that may be removable and retractable along with retractable perimeter walls that may slide in and be secured by a sleeve clip 56.

As illustratively depicted in FIG. 2G, an exemplary top view of the exemplary single orifice velocity sensing apparatus 77 may be shown with a cut-away to illustrate a side view of FIG. 2H. As illustrated, a snap-in supplemental perimeter wall 995 may have a slight vertical pitch sloping from top towards single manifold assembly 770 and may be disposed into securing sleeve clips 56 when apparatus 77 is disposed over a single slot type air devise. Accordingly, the supplemental perimeter wall 995 may enable the reading of relatively very low discharge velocities without manipulation of orifice channel 100. As described, neodymium or similar magnets 57 may be disposed inside the top perimeter gasket 79 having sufficient strength to seat securely to an air devise made of any ferrous material or other ferrous trim or pre-existing mountings to enable handsfree operation. Exemplary mounting bracket sleeves 925 may be secured to the perimeter wall 995 to hold a narrow lightweight telescopic rod 990 that comprises a pivoting type locking arm 883 that can be attached to rod 990 when a potential obstruction may be beneath the air devise being measured.

Figure 2I:
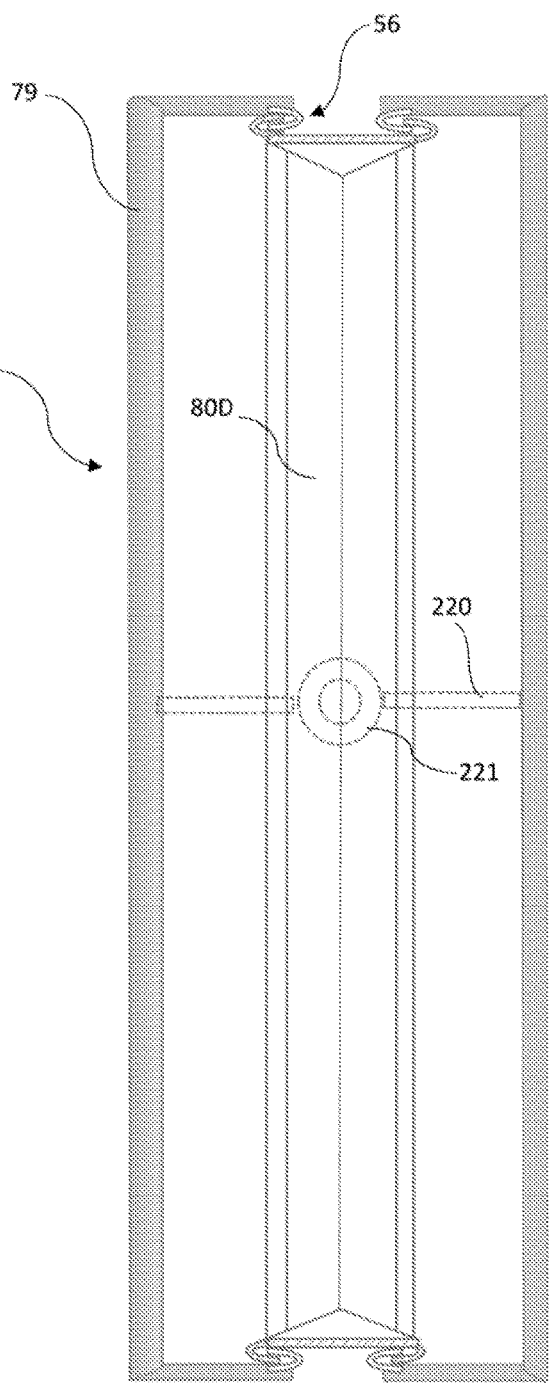
FIG. 2I illustrates an exemplary additional view of another exemplary portable air velocity measuring device.

FIG. 2I illustrates a top view of the exemplary detachable and expandable rectangular apparatus 77 wherein the slide-in clips 56 secures the interchangeable dome assemblies 80 and 80D in place without movement when disposed over an air devise 180.

Further contemplated in the disclosures herein are air sources and devices used in buildings, homes, and other places where flowing fluids are required and can be measured that have pre-configured magnetic or other clipping sections to receive attachment from the sensing apparatus 77 disclosed herein. In other words, it is another aspect of the exemplary disclosed inventions herein to have air sources with surfaces that allow for quick coupling with any of the perimeter walls of any of the devices disclosed and/or magnetic reception points for magnetic holding of the same. Thus, the facia of air devices and the components that allow them to be maintained in ceilings and other passageways of residences or occupiable structures may employ non-obstructive fasteners/magnetic surfaces to facilitate use with the various embodiments of velocity measuring devices disclosed herein.

FIG. 3 further illustrates a transparent front view of the exemplary lightweight and low-profile embodiment 70 that affords a technician 140 the ability to easily maneuver the apparatus over fixed obstacles without impeding the validity of the measurements. The depth of the housing 70 may be directly proportional to the width to sense a relatively laminar velocity across the bidirectional pitot array sensing ports of the manifold 770. When the handheld cady assembly 90 may be attached to the bottom of the facilitator structure 204 the technician may freely access and reach flowing fluid sources without the need of a ladder which may save a sustainable amount of time and effort. The pole cady assembly 90 may further assist the technician in situations where a fixed obstruction such as a laboratory table or cabinet 136 could stymie a technician from deploying a ladder or when standing on a ladder and maneuvering a velocity measuring apparatus 70 could present an unstable or potentially a hazardous working condition.

The articulating arm 83 with an optional locking positioner (e.g., friction-fit, screw-nut combination) may be disposed and set into a plurality of desirable angles for ease and expedience in obtaining measurements and accessing flowing fluid sourced throughout a facility without the additional strain and necessity of heavy or cumbersome ladders. FIG. 3 further illustrates the ease in creating a tight seal around the flowing fluid source when the light duty spring 82 compresses slightly and may further prevent any damage to an acoustical type ceiling 205. The foam rubber gasket 79 disposed above the rigid support flange 94 may expand and produce a tight seal should there be a difference in surface heights. The handle 86a and palm ball 86b may be added to the assembly 90 to reduce stress or fatigue when manually maneuvering and placing the measuring apparatus 70 in place when taking measurements. In an alternative embodiment, ball 86b may be used with an appropriate pedestal to ensure proper articulation of handle assembly 90 to maintain precise placement of the device 70 with respect to the source 280.

FIG. 4 provides a top view of an exemplary square shaped velocity measuring apparatus 70 wherein there may be four collection channels with a bidirectional pitot array velocity measuring manifold assembly 770 substantially disposed in the middle of each collection channel to accurately sense and measure the radial velocity from a flowing fluid source. The bi-directional aspect of the manifold assembly may be only applicable when disposed in a collection channel 202 in which the upper tube 72 may then sense a slight vacuum state when measuring extracted velocities from a source 280. The collection channel 202 may further ensure precise and repeatable measurements as the velocity profile may be not susceptible to drift velocities commonly found when measuring substantially low velocities. The collection channel 202 may be disposed on all four sides of the perimeter walls 79 such that there may be two elongated collection channels 202 that extend the length of the perimeter wall that senses any elevated discharge velocity from the corners of a flowing fluid source without distorting the measured velocity across the bidirectional pitot array velocity sensing manifold 770. Disposed parallel and adjacent to the facilitator 204 may be two slightly shorter channels 212 also disposed adjacent and parallel to the facilitator.

The total pressure sensing tubes 72 disposed in the elongated collection channels 202 may comprise spaced-apart sensing ports 71 positioned along the tube axis in a direction extending distally from the mean diverting collection chamber hub 75. In an exemplary embodiment, each tube 72 may implement a spacing of ports 71 according to principals utilized in the log-Tchebycheff and/or based on experimental measuring of particular pitot-tube type measuring points. Measurements may be recorded when a start reading icon on a smart phone or other electronic device may be depressed. The application software may have a unique time interval which affords the fluid velocity to become fully enveloped in the collection channel 202 and 212 before displaying the measured flow for unparalleled precision and repeatability. In a preferred embodiment, the spacing of the apertures is closer at the points most distal from the diverting hub 75. In a most preferred embodiment, about 20-40% of the apertures are located along 10-30% of the length of the tubes 72/74. In an even more preferred embodiment, about 20% of the apertures are located along the 10% of the length of the tubes located most proximal to the diverting hub 75. For example, an exemplary sensing tube 72/74 comprising 12 apertures may have the configuration of a cylindrical tube 11 inches long and having a group of nine (9) separate 0.625 inch diameter chamfered apertures whose centers are each spaced apart from the next by 1 inch and a group of three (3) 0.625 inch diameter chamfered apertures whose centers are each spaced apart from one another by 0.75 inches. The group of nine (9) apertures may be proximal to or distal from the diverting hub while the group of three (3) apertures is opposite the group of nine (9) apertures, and in either case, the aperture in the group of nine (9) most adjacent the aperture in the group of three (3) may be spaced by 1 inch. In this way, the three apertures and their reduced spacings would occupy about 28% of the total length of the sensing tube. Thus 25% of the total sensing tube apertures may be located along 28% of the length of the sensing tube. In all measurements of aperture spacing, the full diameter of the aperture and the reduced spacing between each such aperture should be added and divided by the total length of the sensing tube measured from tubular end to tubular end (regardless of whether the tube's end may be embedded in another structure or integrated with the wall of another structure). Thus a tube that is embedded in a wall of a structure reaches its tubular end when the structure ceases to have the same conduit cross-section of the tube in question. While the dimensions of used above are provided for explaining this embodiment, the skilled artisan can use any known aperture size for the particular application and needs.

In an alternative embodiment, overlapping calibration tubes may be located along the sensing tubes to block and/or open different apertures depending on how the overlapping calibration tube is turned.

The total pressure sensing tubes 72 as illustrated in collection channels 202 may be secured to the perimeter walls 95 and sleeved into a rubber type grommet 115. The total pressure sensing tubes disposed in collection channels 212 may be secured to the inner housing wall 195 having a substantially thin wall construction and a relatively smooth non-ferrous and slippery inner plastic surface. Illustrated around the top of the walls of a perimeter of the embodiment may be a foam rubber type gasket (such as gasket 79) to make a tight seal when the apparatus 70 may be disposed adjacent a flowing fluid source 280.

According to the illustrative embodiment of FIG. 4, a cut-away top sectional view illustrates the fluid communication wherein, each total and static pressure sensing tubes communicates to the relatively equally positioned diverting hub 75. The fluid collected through each diverting hub 75 may be then transported through a relativity firm and semi-flexible tube 111 to connecting barb fittings 118. An exemplary leveling hub 747 may have a predetermined cavity to accept the fluids from each of the diverting hubs 75 without influencing the mean should the velocity in any particular channel be greater than any of the other three being sensed. There may be two leveling hubs 747 disposed underneath the facilitator dome structure 80 and secured to the facilitator structure to accept an exemplary total (dynamic) pressure being transmitted from the total pressure side of the diverting hubs 75. Similarly, the static pressure leveling hub 747 accepting the static pressure being transmitted from static pressure side of the diverting hubs 75. The leveling hub each transmits a single pressure signal to the wireless (DP) transmitter 99. There may be a pressure transducer within the transmitter 99 housing which may convert the differential pressure (more commonly referred to as the velocity pressure (VP)) signal to a voltage which may then be transmitted wirelessly to a smart type of mobile device 92. Alternatively, a plurality of differential pressure transducer 99 for each bidirectional pitot array velocity measuring manifold assembly 770 may be disposed in the wireless transmitter 99 and communicate collectively to a smart type mobile device 92.

Figure 5A:
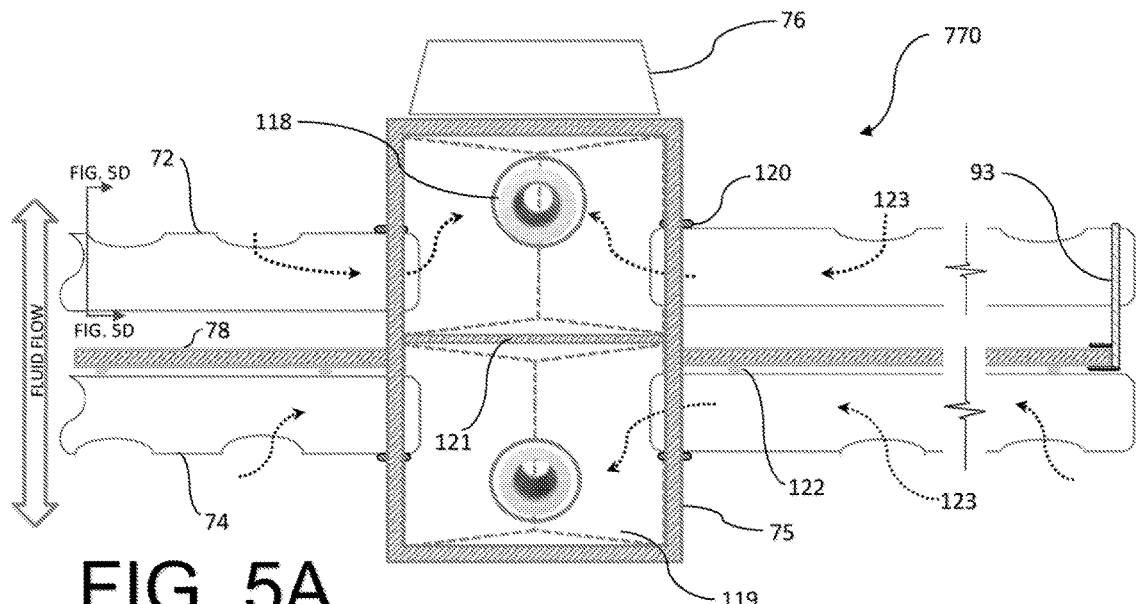
FIG. 5A illustrates an enlarged cross-sectional view of an exemplary diverting collection chamber hub according to one exemplary embodiment of the invention disclosed herein.

Referring to the illustrative embodiment of FIG. 5A, an enlarged cross-sectional and transparent view of the center mean diverting collection chamber hub 75 is provided. Further illustrated are partial sections of an exemplary bidirectional pitot array velocity measuring manifold assembly 770, which in an exemplary embodiment may contain a single manifold consisting of two total pressure tubes 72 and two static pressure tubes 74 configured for mean pitot array velocity sensing. Each of tubes 72 and/or 74 may extend laterally and be joined by the center mean fluid diverting hub 75 while being configured to obtain precision measurements from a range of substantially low velocities to substantially high velocities while maintaining the same accuracy across the velocity spectrum. The bi-directional aspect may be so the same measuring apparatuses may be used for measuring both discharge velocity and extracted velocity from flowing fluid sources, e.g. like source 280. When the manifold 770 may be disposed in any collection channel and measuring discharge velocity from a flowing fluid source 280, there may be a proportional separation between the total pressure sensing tube 72 and the dispersing blade 78 to allow the Coanda Effect to occur without influencing or distorting the static pressure being sensed by the sensing tube 74. When measuring extracted velocity, the fluid may converge onto the sensing tube 74 in a relatively laminar state and an exemplary dispersing blade 78 may operate to divert the fluid away from the static pressure sensing tube 72.

In an exemplary embodiment, multipurpose dispersing blade 78 may enable a fluid separation from the total pressure mean sensing tube 72 while the static pressure sensing tube 74 may only sense the static pressure within the collection channel in which it may be disposed. The dispersing blade 78 may also act as an amplification plate that magnifies the signal indicative of the pressure when in contact with substantially low velocities from the source. The cavity of each diverting hub 75 chamber may have a substantially greater internal volume than the sum of the sensing tube orifices to transmit a single uniformed fluid to the discharge barb fitting 118. The diverting hub 75 may have a plate 121 that separates the total pressure chamber 72 from the static pressure chamber 74 and each chamber discharges the collected fluid through the barb fitting 118. In an exemplary embodiment, an exemplary barb fitting 118 may be disposed relatively in the center of each hub chamber and slightly forward of the inlet aperture of sensing tubes 72/74. The barb fittings 118 may be cylindrical in shape and made of nylon or similar rigid plastic for attaching and securing the communicating tubes 111 that transports the fluids to the centralize leveling hub 727 for velocity measuring device 77 and leveling hub 747 for apparatus 70. While in all embodiments thus far, sensing tubes 72/74 have been illustrated as substantially circular in cross-section, those skilled in the art may enable the disclosures contained herein using sensing tubes of any variety of rounded cross-section or polygonal cross-sectional. Accordingly, while the apertures/ports 71 may also be shown to be longitudinally aligned in the illustrative embodiments, it may be contemplated that on a multi-surface tube 72/74 the apertures may be off center from the longitudinal axis of the particular tube and can alternate or achieve any other type of arrangement or pattern about such tube 72/74 as is needed for the particular application. For example, where a sensing tube 72 may have an octagonal cross-section, a port 71 may be located at the upper-most face adjacent to a port 71 that is located on a face angled away from the upper-most face per the dimensions of the octagon. Alternatively, the ports 71 may vary in size about the upper surface of such multi-facial sensing tubes 72/74 so that a port 71 of one size is on an upper-surface and smaller ports 71 are located adjacent to it but on faces that are angled with respect to the upper-surface. Thus, the invention contemplates apertures/ports 71 having multivarious placement to accommodate velocities in numerous directions. In a still further embodiment, the sensing tubes 72/74 may be capable of adjustment via telescoping or interchangeable sections that either increase, decrease, and/or change the location of one or more ports 71. This alternative aspect of this invention provides for unique customization of the device 70 that permits analog adjustment without reliance on dynamic digital correction factors to measure the velocity profile from a particular source.

The diverting hub 75 may have a notch in each of the apertures to fasten the sensing tubes parallel to the direction of velocity via a protuberance 120 on the particular sensing tube 72/74. An exemplary protuberance 120 may enable alignment of the tubes 72/74 with the sensing orifices intersecting with the hub 75. The fluid arrows 123 illustrated in FIG. 5A may provide an exemplary movement of fluid within the sensing tubes 72/74 and any collection channels. There may be a dispersing blade 78 attached to the diverting hub 75 that may traverse the length of the sensing tube 74. In an exemplary embodiment, at a location distal from the diverting hub 75 there may be a stabilizer 93, such as an EPDM or similar rubber stabilizing bracketing sleeve, that may slide over the sensing tube 72/74 and/or may be fastened to the dispersing blade 78 to reduce and/or eliminate movement of the sensing tube 72/74 and/or for fastening to mounting grommets 115. In an alternative embodiment, a bead or layer of silicone type adhesive 122 may be equally spaced across the length of the sensing tube 72/74 and bonded to the dispersing blade 78 which ensures the blade remains stationary as velocity passes over it. In another exemplary embodiment, the dispersing blade 78 may have a greater separation from the mean sensing tube 72 so that as the velocity converges onto the sensing tube 72 the fluid may move smoothly about the tube and the dispersing blade 78 may prevent any Coanda effect from creating eddies that could influence the static pressure being sensed by the sensing tube 74.

Figure 5B:
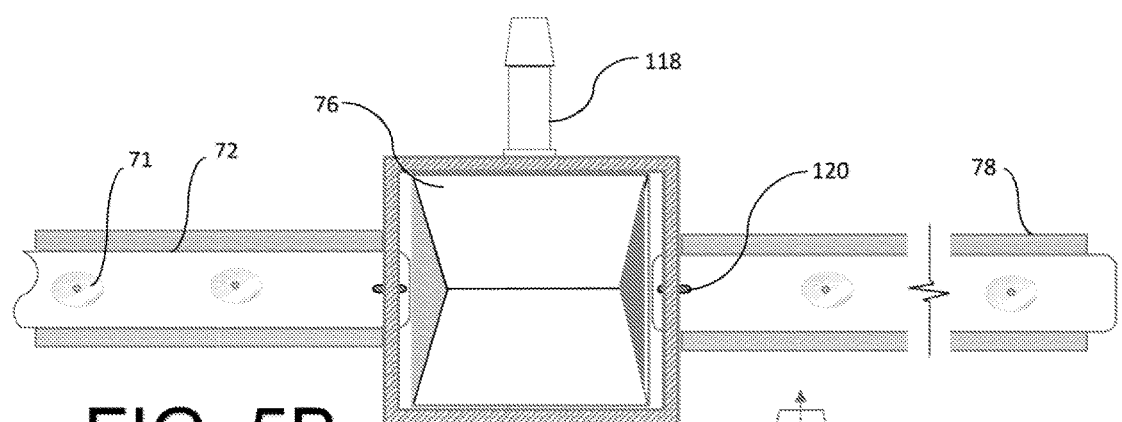
FIG. 5B illustrates a sectional top view of an exemplary bidirectional pitot array velocity measuring manifold assembly according to one exemplary embodiment of the invention disclosed herein.

Referring now to the illustrative embodiment of FIG. 5B, an exemplary sectional top view of an exemplary bidirectional pitot array velocity measuring manifold assembly 770 provides a view of an exemplary chamfered shaped aperture 71. As further illustrated in this embodiment, the dispersing/amplification plate 78 may be disposed below the sensing tube 72 in such a way as to produce a repeatable magnification of the velocity pressure signal to be measured by transmitter 99 and/or device 92. In an exemplary aspect, a slightly curved triangular shaped fluid dispersing top 76 may be disposed atop the diverting hub 75 to prevent turbulence or pulsation from effecting or distorting the fluid being sensed at the communicating ports 71. In this exemplary view, the top of protuberance 120 may be shown in alignment with the communicating ports 71. The dispersing blade 78 may be sufficient in width as to divert any fluid that may be within the velocity boundary layer of the total pressure sensing tube away from the static pressure tube that could otherwise cling to the walls of the cylindrical pressure sensing tube, wherein influencing the downstream pressure being sensed.

Figure 5D:
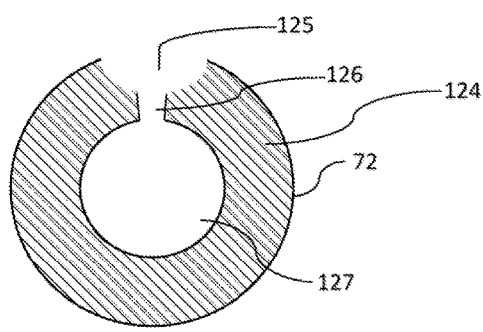
FIG. 5D illustrates a cross-sectional view of a portion of the exemplary bidirectional pitot array velocity measuring manifold assembly of FIG. 5A.
Figure 5C:
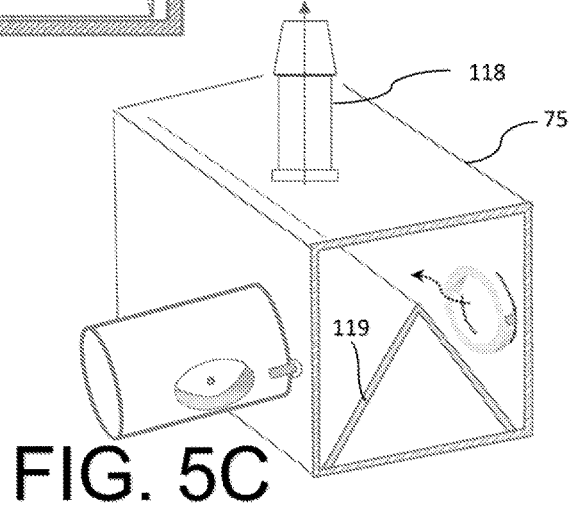
FIG. 5C illustrates a perspective view of the exemplary bidirectional pitot array velocity measuring manifold assembly of FIG. 5B.

FIG. 5C provides an exemplary perspective view illustrating the path the fluid takes as it approaches the triangular shaped directional divider 119 and proportionally diverts the fluids converging in the cavity of chamber 75. According to this illustrative embodiment, the accepting chamber 75 may have substantial volume relative to the source communicating ports 71 so as to facilitate discharge of fluid out through the barb fitting 118 in a substantially controlled and/or turbulence minimizing manner.

FIG. 5D provides an illustrative enlarged axial cross-sectional view of an exemplary pitot array velocity measuring tube 72 comprising a wall thickness 124 having substantial depth to support an exemplary conical-shaped chamfer 125. Further provided for in this illustrative embodiment is an orifice conduit 126 that is configured to funnel the receiving fluid flows into a highly smooth and/or slippery inner chamber 127 of the sensing tube 72. The conical shaped chamfer 125 may be configured to compensate for the vector spray effect or any yaw angle (and as substantial as a 60° yaw angle) effect occurring from the discharge of a flowing fluid source that would otherwise alter the sensed fluid. As the fluid may be transmitted to the inner chamber 127 the volume of the inner chamber may be sufficient in size to absorb any bursts of velocity pressure without misrepresenting the mean fluid. Accordingly, in an exemplary embodiment, the substantially smaller orifice conduit 126 may further act as a pulsation snubber. Those skilled in the art may readily determine the sizing of each of the aforementioned conduits and chamfers to affect the teachings disclosed herein.

FIG. 6A provides an illustrative perspective view of an exemplary embodiment 110 of the portable or hand-held free-space velocity measuring station 110. An exemplary measuring station 110 may be capable of making precision measurements in open-air environments, such as critical life safety and other types of velocity testing, e.g., for control and verification of a smoke plume of an active fire. As illustrated, there may be a vast array of sensing ports 102 appropriately spaced together to sense a comprehensive amount of dynamic fluid points producing a precise mean total pressure signal while a static tube 103 may sense the ambient pressure within the housing 106. After an exemplary sensing operation, an exemplary static tube 103 may transmit a stable and accurate velocity pressure to the wireless transmitter 99. In an exemplary embodiment, transmitter 99 may be used in accordance with the disclosures herein using a higher confidence level of measurements. In contrast, similar open area velocity sensing instruments such as anemometers may be susceptible to drift velocity error, reverse directional swirl and the effects of foreign migrate burst velocities when the sensing element may be absent of boundaries such as perimeter walls.

In an exemplary embodiment, the walls around the sensing tubes 72/74 may have a proportionally shallow depth, which may enable a substantial increase in the accuracy of the measurements and may substantially alleviate the potential for directional error when low velocities are measured. Additionally, the proportional shallow depth may substantially alleviate fluid swirls around the sensing element, a phenomena typically associated with reverse directional velocity pattern. The velocity measuring station 110 may be disposed within a housing to be suitable for use on outside air intake apertures, e.g., ones where high winds may be unpredictable and can influence the accuracy of measurements.

In an exemplary embodiment where station 110 may be rectangular-shaped, station 110 may have two walls 106 that run lengthwise and parallel to the total pressure pitot array sensing tubes 101. Accordingly, adjacent walls 106 may be substantially narrower to form a relatively linear velocity profile across each total pressure pitot array sensing tubes 101, which may be the same or substantially the same in form, dimension, and kind to sensing tubes 72 and/or 74. Additionally, the walls 106 may further act as chamber for a more realistic representation of the static pressure being sensed at orifices 104. In an exemplary embodiment, orifices 104 may be equally spaced across tube 103 and enable communication of the sensed velocity measurements to the low side of the wireless pressure differential (DP) transmitter 99, e.g., by converting the total and static pressures into a velocity pressure within the transducer of the wireless transmitter 99. In another aspect of this exemplary embodiment, walls 106 may be made of rigid plastic having a thickness to support the mounting of components without the potential for stress on the walls 106.

In an exemplary embodiment, the inlet perimeter rim around casing 110 may have a bell-mouth tapered shape, wherein the slightly curved flange 116 may be configured to add rigidity to the perimeter walls 106. The upstream side of the flared-out flange 116 dimensionally introduces a lower inlet velocity, resulting in a less restrictive and turbulent condition as the velocity converges on the total pressure sensing tube 101.

An exemplary total pressure pitot array sensing tube 101 may have a substantial plurality of closely spaced communication ports 102 to producing a highly representative velocity profile within the embodiment 110. The closely spaced communication ports 102 along the sensing tubes 101 further compensate for any irregular velocity bursts when the velocity measuring station may be disposed on a supply flowing fluid source.

There may be two total pressure sensing tubes 101 that may be aligned parallel and proportionally spaced apart from each other and traverses the length of the rectangular embodiments casing 110 wherein each tube equally senses a uniformed mean velocity. The exemplary total pressure pitot array sensing tube 101 may have a relatively thick wall to accept the plurality of relatively tightly spaced communicating ports 102 equally disposed with each aperture having a relatively wide chamfer shape. The chamfer aperture may be sufficiently spaced apart as to not influence or distort the sensing of the neighboring apertures. The geometry of the chamfer's concavity may be designed to reduce any effects of yaw or pulsation as the fluid converges into the orifice trough of port 102. In situations where there may be a burst of velocity converging into an aperture 102, the chamfer's formation acts as a stabilizer to enable the velocity to be funneled into the communicating orifice trough 102. In an exemplary embodiment, an exemplary orifice trough may be substantially smaller and may have a pulsation snubber effect inside the sensing tube 101.

With continued reference to FIG. 6A, a diverting dome 76, which may be triangular shaped, may be disposed above the mean diverting hub 105 to divert incoming fluid and prevent a turbulent condition from occurring at the total pressure sensing ports 101. Each mean diverting hub 105 may communicate to the leveling hub 112 which then may transmit a single total pressure fluid signal through a ridged plastic conduit 117 having an inner area sufficient to transport the fluid smoothly and without unnecessary resistance through a barb fitting 118 to the high side of the (DP) transducer disposed within the wireless DP transmitter.

Additionally, an exemplary mean pitot array sensing tube 101 may have substantially closely spaced communication ports utilizing similar techniques as optimization methodologies using Neural Networks (NNs) and Extended Great Deluge (EGD) algorithms for a high degree of accuracy and higher measurement iterations when disposed in a shallow embodiment and the inlet velocity may be in close proximity to the sensing tubes. The tube 101 may be secured to the perimeter housing 106 with a silicone or similar rubber type grommet and sleeve 115. There may be a single rigid static pressure sensing tube 103 with a plurality of communicating ports disposed behind the total pressure sensing tube 101, which in one aspect of the illustrative embodiment may be relatively centered, and may also be secured to wall 106 by a rubber type grommet and sleeve 115 and a barb fitting 118 on the discharge end of the sensing tube 103. As illustratively exemplified, an exemplary tube 103 may be passed through the wall 106 and secured in place by a rubber grommet that sends the mean fluid through a silicone type tubing 111 and communicates the mean pressure directly to the wireless differential pressure (PD) transmitter 99. The wireless (PD) transmitter may easily be removed from the support cradle 113 that may be disposed on the perimeter wall 106 using attachment mechanisms known to those skilled in the art, such as, for example, a hook-and-loop type fastener.

As may be further illustrated, a pivoting ball head mount 114 having a locking positioner may be secured to the perimeter wall 106 and may be positioned and maneuvered for precise placement of the device 110 when disposed over an aperture. There may be a handle 187 which may be screw into a rod with threaded ends 184 and connected to the ball head mount 114.

According to the illustrative embodiment of FIG. 6B, an exploded side view of the rubber grommet sleeve 115 may be designed for use in any and all embodiments disclosed herein but may have a slightly larger protuberance on the exterior side of the perimeter wall 106 and may be pressed through a pre-drilled aperture and fastened securely against the wall 106. Accordingly, an exemplary grommet sleeve 115 may act to secure the sensing tubes 101 from movement and error from potential vibration.

According to the illustrative embodiment of FIG. 6C, an exploded side and top view of an exemplary blank-off plate may be depicted so that the aperture being measured may be smaller than its use in other embodiments. In one aspect, a reducing blank-off plate 129 made of EPMD or similar type rubber may be used to securely fasten to the total pressure sensing tube 101. In another aspect, nubs 130 may be disposed tightly inside the orifices 102 reducing the active sensing ports without effecting the measured velocity.

According to the illustrative embodiment of FIG. 7A, an exemplary transparent side view of the exemplary compact hand-held conical velocity measuring apparatus 777 may have a relatively rectangular shaped cross-section. As illustrated, the exemplary apparatus 777 may comprise a converging nozzle 757 with a smooth transitioning throat designed to maintain a linear flow characteristic until entering into a velocity sensing manifold 712. In an exemplary embodiment, the average velocity into apparatus 777 may be quantified with a bidirectional mean sensing manifold 712 for precise measurements at substantially low velocities. As discussed herein, the neck or throat of this illustrative embodiment may be substantial in length as compared to the manifold 712 to produce a relatively linear flow characteristic as the fluid converges on to the sensing tubes of the sensing manifold. In one aspect of this exemplary embodiment, the top of the apparatus 777 may have a foam rubber type gasketing 79 around the perimeter for a tight seal when disposed over a flowing fluid source (e.g., source 280). The perimeter walls 757 may be constructed of relatively thick ridged plastic or carbon fiber to support the extended handle assembly 114 and may optionally have a relatively smooth non-ferrous and slippery inner surface.

The manifold assembly 712 may utilize the high referencing sensing tubes 101 to produce a precise average measurement at relativity low velocities. In an alternative aspect of this exemplary embodiment, slight curvature of the walls of the apparatus 777 converging into the throat of the manifold 712 may disseminate a smooth and non-turbulent flow condition across the sensing tube(s) 101. In the same or other aspects of this exemplary embodiment, a triangular curved diverting dome 76 simulating the Coanda effect may be disposed above the mean diverting chamber hub 75 to substantially reduce and/or prevent a turbulent condition from occurring as the velocity converges at the total pressure sensing ports 102. In another aspect of the disclosures herein, the total pressure and static pressure diverting hubs 75 may have a ridged plastic tube 128 that discharges through a rubber grommet sleeve 115 through the embodiment wall 757 to a barb fitting having a 90° angle 129. Accordingly, the barb fitting may be connected to a rubber tube 111 to communicate the mean fluid directly to the wireless pressure transmitter 99. As disclosed herein, an exemplary pressure transmitter 99 may be disposed on any available surfaces of the apparatus 777 and may be fasten in place using mechanical means known to those skilled in the art, e.g., with a hook-and-loop type fastener. An exemplary pivoting ball head mount 114 having a locking positioner may alternatively be secured to the perimeter wall 757 and positioned for precise placement when disposed over a flowing fluid source. As illustratively provided for in this exemplary embodiment, a detachable handle 187 may screw into a rod with threaded ends 184 and connect to an exemplary ball head mount 114. An exemplary amplification plate 78 may be used to create a coefficient for a greater differential representation may be secured to the lee side static tube 101 by a bead of silicone type adhesive 122. In another aspect of this exemplary embodiment, when substantially low velocities are sensed, the conical shape of embodiment 777 may take advantage of the de Laval nozzle principals for subsonic velocities to produce measurable and steady differential pressures at an exemplary DP transducer.

According to the illustrative embodiment of FIG. 7B, an exemplary top view of the exemplary compact hand-held conical velocity measuring device 777 may be depicted with bidirectional pitot array velocity measuring manifold assemblies 712 disposed relatively center and proportionally spaced in the collection channel for a precise delineation of the average velocity within the collection channel. In one aspect of this illustrative embodiment exemplified by FIG. 7B, a bi-directional aspect of the manifold assembly may be only applicable when disposed in a collection channel in which the upper tube may then sense a slight vacuum state when measuring extracted velocities. The collection channel may further ensure repeatable measurements as the velocity profile may be not susceptible to drift velocities commonly found when measuring substantially low velocities. In one aspect of this exemplary embodiment, each end of the mean sensing tube 101 may be fastened to the perimeter wall 757 with a rubber type fastening grommet 115. The sensing tube 101 securely disposed into the aperture of the rubber grommet sleeve to prevent the tube from movement and pulsation as the velocity converges onto the sensing tubes 101. Each sensing tube 101 having a multitudinous number of communication ports tightly spaced together for a greater magnitude of delineation of the mean velocity across the sensing tubes wherein, the higher rate of iteration to produce a higher quantifiable mean fluid signal to the mean diverting hub 75. A pivoting ball head mount 114 having a locking positioner may be fastened to the perimeter wall 757 and may be positioned and maneuvered into position for precise placement when disposed over a flowing fluid source. A smooth and conforming handle 187 may be fastened to a telescoping rod 284 and connected to the ball head mount 114. A swivel mount smart phone cradle 86 may be attached to rod 284 for easy in observing the data being transmitted to a smart phone type device from the wireless transmitter 99 disposed on the opposite side of the embodiment 777.

According to the illustrative embodiment of FIG. 7C, an exemplary perspective view of the exemplary compact hand-held conical velocity measuring device 777 may provide a cut-away view of the bidirectional pitot array velocity measuring manifold assemblies 712. According to this illustrative embodiment, sensing tube(s) 101 may be separated by an amplification plate 78 made of ridged plastic slightly wider in width then the mean sensing tubes 101. The nubs of the silicone or rubber fastening grommet 115 may be illustrated on the exterior side of the embodiments wall 757. The telescopic rod assembly may be illustrating where it attached to the collection channel/neck of the embodiment and to the pivot action from the ball head 114. The linear profile and relatively smooth conical shape of the manifold funnels the fluid velocity in a uniform manner in developing a uniformed characteristic across the entire length of mean sensing tube 101.

Figure 8A:
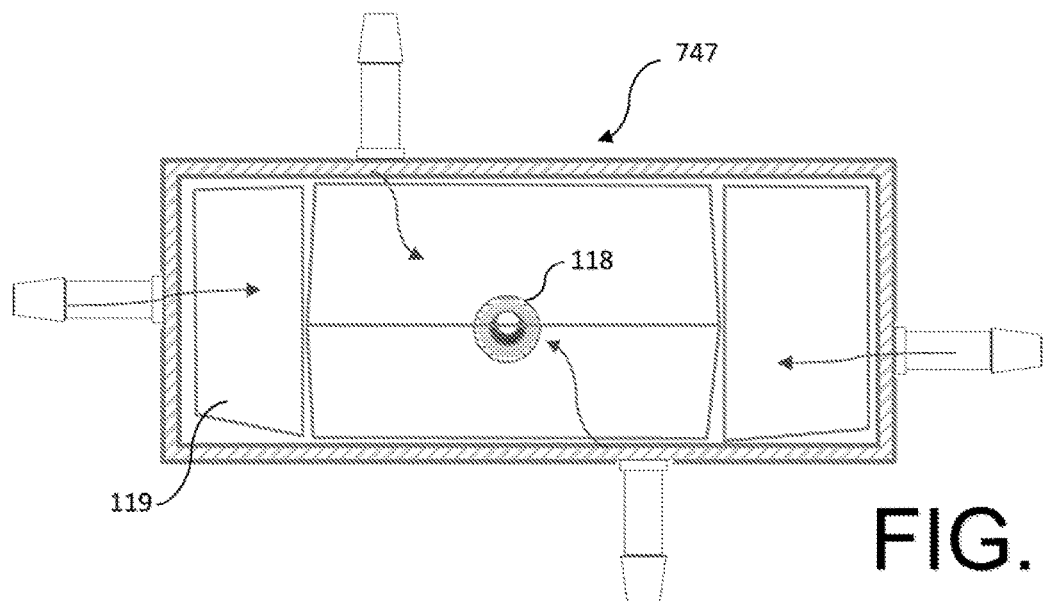
FIG. 8A illustrates an exploded transparent top view of an exemplary leveling hub according to one exemplary embodiment of the invention disclosed herein.

According to the illustrative embodiment of FIG. 8A, an exemplary exploded transparent top view of leveling hub 747 may be provided illustrating hub 747 placement under the facilitator dome 204 for use in communicating with the mean diverting hubs 75 disposed in each channel of the square shaped embodiment 70. Each leveling hub 747 may have a predetermined cavity to accept the fluids from the plurality of diverting hubs 75 without influencing the mean from the varying velocity sensed in each channel. The directional dividing plates 119 disposed inside each chamber having a proportionally sloped plate or a triangular shape. The leveling hub having a relatively thin wall made of lightweight plastic similar to polytetrafluoroethylene or polyethylene terephthalate and having a smooth and slippery surface to minimize friction. In a preferred embodiment, the aforementioned plastic may be environmentally friendly and/or easy for recycling and re-use. Alternatively, the mean diverting hubs 75 may communicate directly to the wireless pressure transmitter 99 wherein, the transmitter housing having a plurality of differential pressure transducers disposed within the housing wherein, collectively communicating to a software application disposed in a smart type mobile device 92.

Figure 8B:
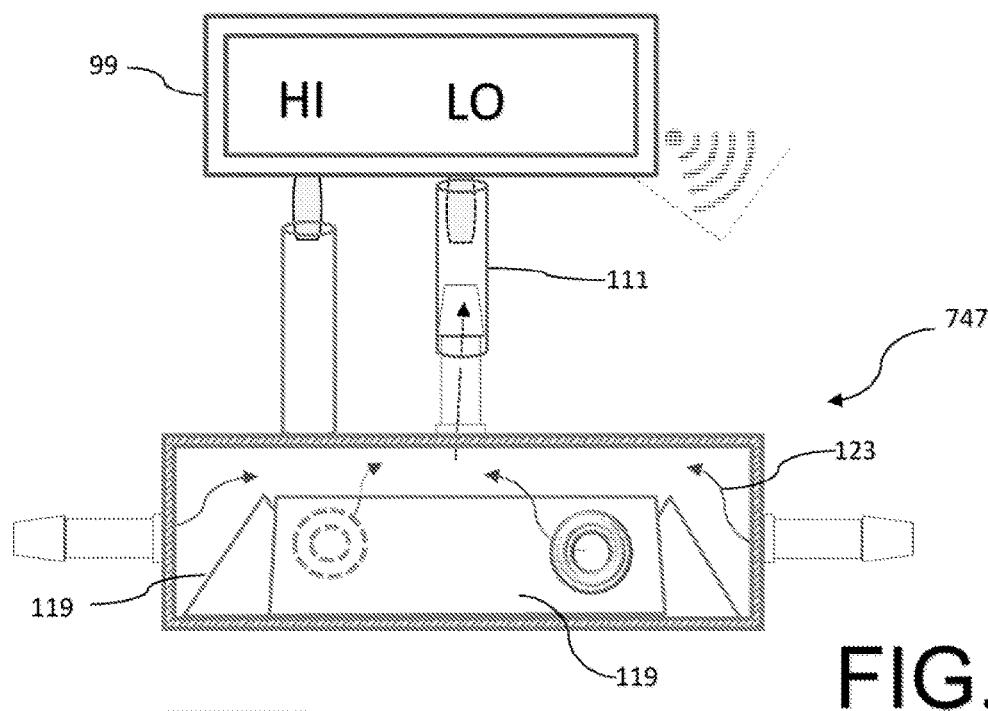
FIG. 8B illustrates a transparent side view of the exemplary leveling hub of FIG. 8A.

According to the illustrative embodiment of FIG. 8B, an exemplary transparent side view of an exemplary leveling hub 747 may be provided having four inlet ports and a single discharge port for communicating from each of the mean diverting hubs disposed around the permitter of the exemplary velocity measuring apparatus 70. According to this illustrative embodiment, each of the four inlet ports and the single discharge port act to discharge communicated fluid from both the static pressure and total pressure leveling hubs 747 to the wireless transmitter 99. The fluid directional arrows 123 may illustrate smooth transfer from each mean diverting hub 75 as the directional guides further acts as a check against the fluid from a more pronounced diverting hub 75 from impacting the mean sensed fluid. The sensed fluid from the plurality of sensing manifolds may be then leveled in the equalizing chamber and transmitted to the differential pressure transmitter 99 producing a mean result without (averaging) error. The semi rigid rubber or fluorinated ethylene propylene (FEP) type tubing 111 having a smooth interior for unrestricted flow to transport the fluid communicating from hubs 75 to leveling hubs 747 or 727 to an ultra-low differential pressure transducer disposed within the wireless transmitter 99. Alternatively, a separate differential pressure transducer could be disposed within the wireless transmitter 99 for each bidirectional pitot array velocity measuring manifold assembly 770.

Figure 8C:
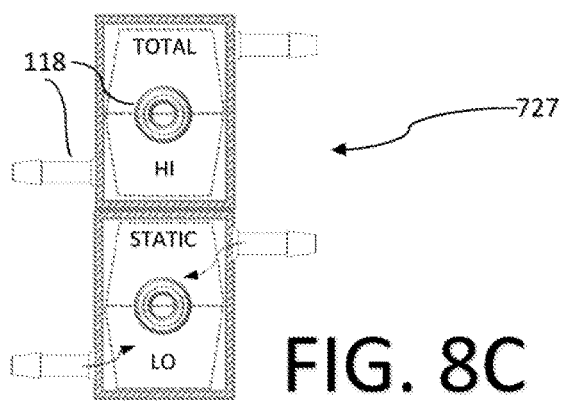
FIG. 8C illustrates a side view of multiple exemplary leveling hubs according to another exemplary embodiment of the invention disclosed herein.

According to the illustrative embodiment of FIG. 8C, an exemplary side view of an exemplary leveling hub 727 may be shown in which the hub 727 may be disposed under the facilitator dome 80 for use in communicating with the mean diverting hubs 75 disposed in the device 77 of rectangular cross-shape or like configuration. There may be a total pressure chamber and adjacent may be the static pressure chamber leveling hub wherein each having two inlet ports which may have proportionally larger cavities than the inlet ports and may be separated by a triangular shaped dividing plate that may be at an angle to smoothly communicate the fluid to the discharge port 118 disposed relatively centered on the leveling hub that sends the fluid signal to the wireless transmitter 99. According to this exemplary embodiment, and any and all others, leveling hubs 747 may be similar but may optionally include 4 inlet ports 118 per hub.

Figure 9A:
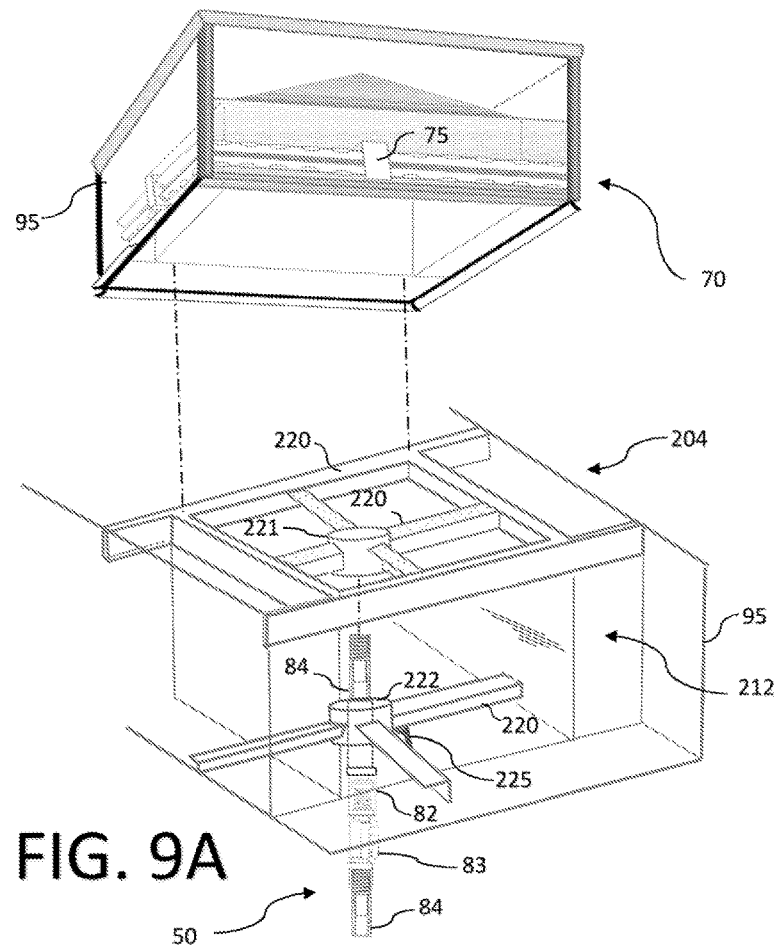
FIG. 9A an exemplary sectional portable air velocity measuring device according to another exemplary embodiment of the invention disclosed herein.

According to the illustrative embodiment of FIG. 9A, an exemplary sectional view of an exemplary facilitator structure 204 may show the structure 204 disposed beneath the rectangular shaped embodiment 70, wherein flat or L-shaped beams 220 made of light weight cellular PVC or similar type material may be used to provide rigid support for the telescopic pole assemblies 50 and 90. An upper centralized stabilizing support hub 221 may have a threaded insert to accept the pole 84 and may be positioned at the fulcrum for balance at the point of equilibrium. In this aspect of this illustrative embodiment, pole 84 may be first slid through the lower centralized hub 222 and extend vertically up to hub 221 for stability and balance while device 70 is maneuvered or suspended overhead and/or in operation. A plurality of lateral L-beams 220 may extend to the cross supports of the inner side of the collection channel 212 walls and may be the base support for the dome disposed on top of the structural beams 220. The centralized hub 222 may have a plurality of lateral L-beams extending away from the hub for support and strength of the facilitator structure to the embodiment apparatus 70 wherein the L-beams may be disposed beneath and support the diverting hubs 75 extending beyond to the outer wall 95. There may be clasps that may be attached to the lower lateral I-beams to secure the total and static pressure leveling hubs 747 and the wireless transmitter 99.

Figure 9B:
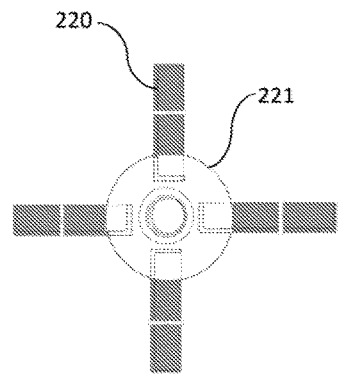
FIG. 9B illustrates an exemplary sectional view of a portion of the exemplary sectional portable air velocity measuring device of FIG. 9A.
Figure 9C:
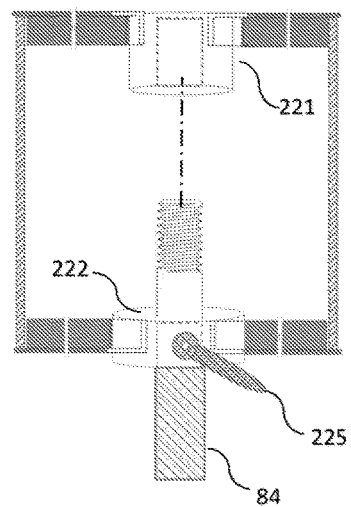
FIG. 9C illustrates a side view of an exemplary telescopic pole according to another exemplary embodiment of the invention disclosed herein.

According to the illustrative embodiment of FIG. 9B, an exemplary a bottom view of a threaded aperture disposed in the center of the centralized support hub 221 may be shown with the lateral structural support beams 220 extending away from the center of the hub. Referring to the illustrative embodiment of FIG. 9C, an exemplary side view of a telescopic pole 84 vertically traversing the stabilizing supports may be shown. According to this illustrative embodiment, lower centralized hub 222 may have a handle 225 and may extend to a compression type brake in the aperture of the centralized hub 222 that secures and prevent the telescoping pole 84 from any movement. The upper centralized hub 221 having a threaded aperture to provide a stable and secure positioning of the pole 84.

Figure 9D:
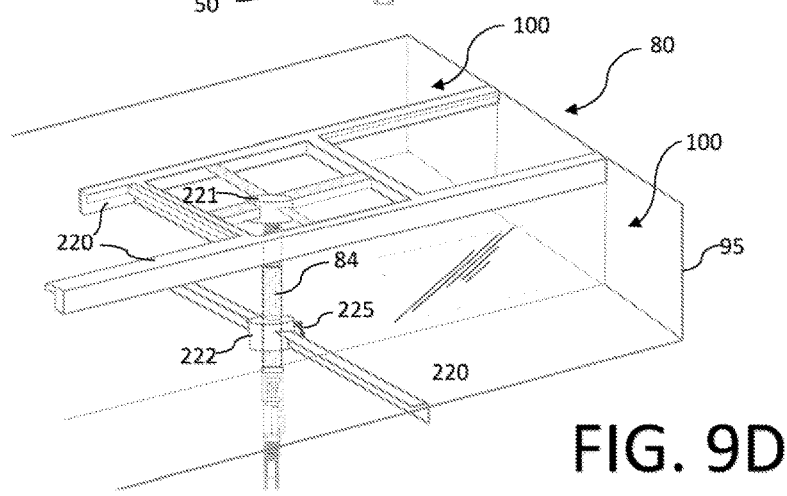
FIG. 9D illustrates a sectional view of an exemplary elongated facilitator according to another exemplary embodiment of the invention disclosed herein.

According to the illustrative embodiment of FIG. 9D, an exemplary sectional view of the exemplary elongated facilitator structure 80 may be shown being disposed beneath a triangular shaped dome while the remainder of device 77 may be structurally similar to facilitator 204. The center of the facilitator structure 80 may further be associated with an L-shaped beam structure 220 that may be relatively square in shape to provide a balanced equilibrium when device 77 is suspended or otherwise used in operation. According to this exemplary embodiment, there may be only two collection channels 100 disposed adjacent to the center of the facilitator. The lateral supports 220 in this embodiment may extend out from the centralized hub 222 and be disposed beneath the diverting hubs 75 to the rigid perimeter wall 95 of the embodiment 77.

According to the illustrative embodiment of FIG. 10A, an exemplary perspective view of a technician 140 positioning an exemplary velocity measuring device 77 over a fixed obstacle such as a bio-safety cabinet 135 or any other similar obstruction without the need for ladders or deploying alternate methods to obtain precision measurements from the flowing fluid source 180. The mobile telescoping arm 90 comprising an articulation means 83 (e.g., ratchet mechanism, screw-tightening, pin-and-hole locking arrangements) may be angled and locked in position above an obstacle such as a bio-safety hood 135 without the need for a ladder. A benefit of the aforementioned embodiment is that arm 90 may reduce fatigue or strain on the body and further reduces the time and effort when taking measurement and affording the technician 140 to easily position the velocity measuring device 77 over the flowing fluid source 180. In an aspect of this exemplary embodiment, a tight seal from the gasket frame 79 may be formed between device 77 and hood 135 to allow for consistent and accurate velocity measurements. The lightweight construction of device 77 may afford the technician the ease of maneuvering the arm 90 and adjusting the articulating arm 83 at an angle necessary for the spring 82 to be compressed slightly to create a tight seal around a flowing fluid source such as 180 which may be disposed overhead or horizontally on a wall.

Figure 10B:
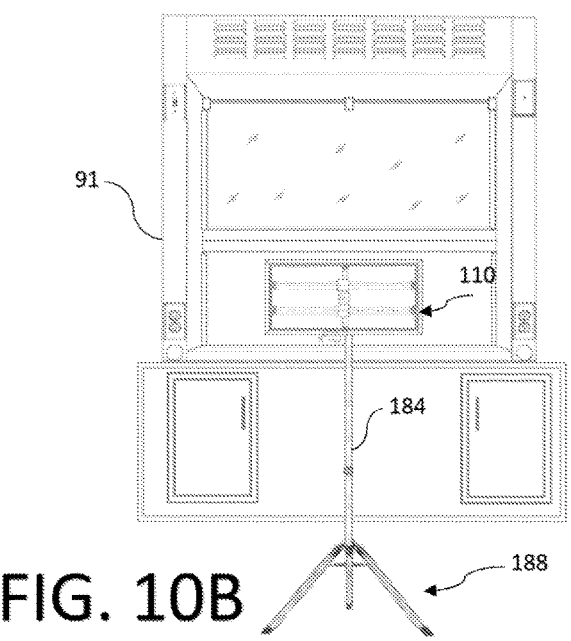
FIG. 10B illustrates a front view of an exemplary wireless hand-held portable velocity measuring station.

According to the illustrative embodiment of FIG. 10B, an exemplary front view of an exemplary wireless hand-held portable velocity measuring station 110 may be shown, whereby the station 110 may be disposed in front of a fume hood 137 sash opening for relatively low velocity measurements. When secured to a tripod 188, a novice in the art may be easily instructed where to properly dispose the apparatus in a fixed position either horizontal or vertically to the sash aperture. In one aspect of this exemplary embodiment, when the velocity measuring station 110 is secured to a tripod 188 and in a stationary position over a HEPA type diffuser or even a passageway for validation of room velocity direction, a technician familiar in the art of velocity measurements may stand away from the apparatus so as to not obstruct or effect the velocity leaving the very low velocity type HEPA Filter flowing fluid source or creating a turbulent condition if standing directly in the velocity flow path.

When having to perform measurements in critical environments such as sterile, hazardous, or highly infectious spaces, it may be prudent and safer to only have a lab technician properly trained and gowned to position the velocity measuring station 110 over an aperture or flowing fluid source while the technician 140 trained in the art of the proper methods and procedures of velocity measurement remain outside the room, wherein the technician 140 could safely and expeditiously obtaining accurate measurements outside the critical spaces and record measurements via the wireless mobile smart device.

Figure 10C:
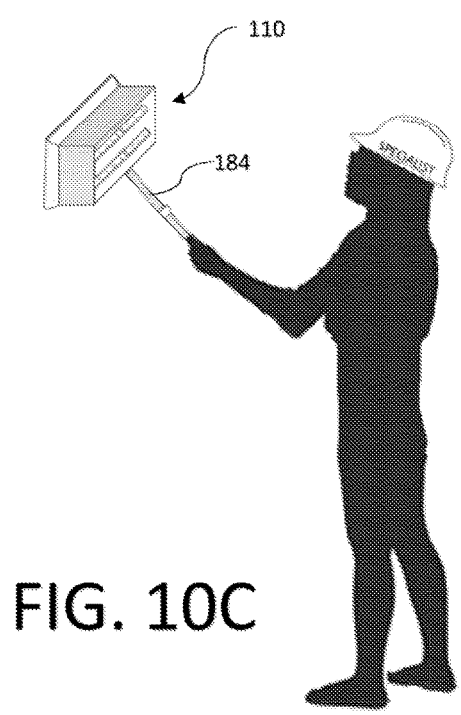
FIG. 10C illustrates a perspective view of another exemplary application of use of another exemplary sectional portable air velocity measuring device.

According to the illustrative embodiment of FIG. 10C, an exemplary perspective view of a technician 140 holding wireless hand-held portable velocity measuring station 110 slightly overhead and while standing out of the velocity stream when verifying velocity detection may be shown. In fire life safety testing, make-up velocities should not exceed 200 FPM at point of event where the flame or Plume may become erratic from excessive velocity and prevent smoke from descending to the occupied level.

Figure 11:
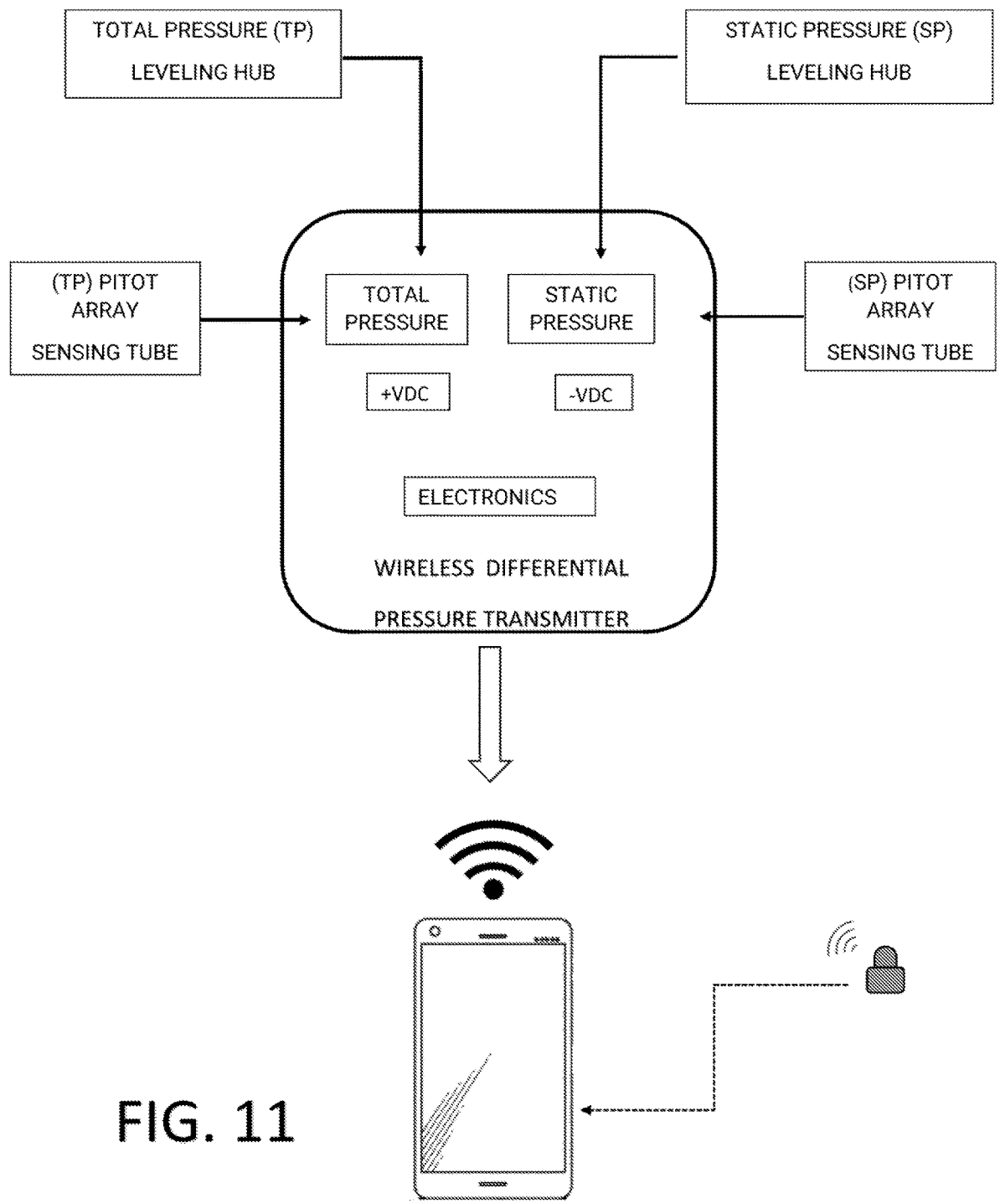
FIG. 11 illustrates an exemplary methodology for an exemplary wireless pressure differential transmitter.

FIG. 11 illustrates an exemplary operation flow for a wireless pressure differential transmitter communicates with a wireless smart mobile device. Accordingly, sensed pressures from the total pressure and static pressure leveling hubs or a pitot array sensing elements may be transmitted through a pneumatic type tubing to a wireless differential pressure transducers. In any embodiments, wireless differential pressure transmitter may be interchangeable with any of the embodiments which alleviates any deviations in accuracy while communicating to the mobile smart device.

In an exemplary first step, the application for the mobile device sends a signal to start taking readings to each transmitter. In a first aspect, when a differential pressure ("DP") transducer reads a low velocity, the application may instruct the system to supply more velocity readings. In memory, a DP versus FPM/CFM curve chart may be stored and updated, among other analytical processes applied thereto.

In an exemplary second step, a curve formula $A_k$ may be applied to calculate changes across a full scale, e.g., 25 cfm up to and including 1000 cfm. Alternatively, the curve formula may serve as a correction factor applied to account for deviations from lowest flow reading to highest.

A back pressure correction factor may also be applied to the DP versus FPM/CFM curve chart. An exemplary situation in which such a correction factor may be applied may involve a static port sensor obtaining a greater pressure (resistance) caused by a substantially high or turbulent inlet velocity. Accordingly, the back pressure correction factor may compensate for losses being produced by the apparatus being placed over a fluid source. Thus, in an exemplary embodiment, the back pressure correction factor may allow for calculation of the effects the apparatus has when placed over a fluid flow source and where fluid (e.g., air) may be backed up and ultimately reading a lower flow rate than actually exists.

In an exemplary third step, a first reading of the static pressure may be made and then operated upon with a correction factor of back pressure if sensed (e.g., add, multiplication, or other mathematical operator). In an alternative embodiment, a transmitter may use prior-produced charts of DP versus FPM/CFM, such as, for example, charts provided by particular fluid flow device manufactures. In a further alternative embodiment, the correction factor may be based on the resonant frequency of the tubes.

Where the resolution of the charted curve deviates from a linear or other continuous relationship, a K curve is generated for the purpose of re-calibration. A similar curve-fixing method may be programmed to iteratively generate the best curve fit for the readings based on deviations from the non-distorted readings (e.g., comparison of R-squared values). In another aspect of this exemplary embodiment, the adjustable K Factor may be further used for verification and re-calibration purposes.

The operational flow described may be implemented when a user requests a reading, using a read button or other digital switch on a touch screen, for example, that when activated will obtain a reading of velocity, but the reading may not take place at the instant the read request is activated by the user, but may take place after a delay in time to ensure each collection channel is fully enveloped and a stable velocity profile prior to such reading being displayed. In an exemplary embodiment, an analog curve (similar to a speedometer as a car accelerates) may be utilized to display a visual measurement of the aforementioned delay or such an analog display may be a linear bar graph type with multiple colors.

Further contemplated in this exemplary operational flow may be audio announcements (such as verbal, text-tospeech, or a audio notifications/sounds) provided on or via the smart device to inform the operator when the reading is displayed.

In an exemplary embodiment, all displayed readings may be stored in memory or may be reproduced in other digital or readable forms (e.g., a spread sheet type format). When the displayed measurement is uploaded into a spread sheet on a row where a design value is provided, a color code system may be used if the measurement is outside of the tolerance. In an aspect of this exemplary embodiment, readings can be added to the spread sheet and summarized. In a further aspect of this exemplary embodiment, when a spread sheet is utilized, pressing on the cell where the reading is to be placed on column or row, once read is depressed, the measurements in downloaded directly to the cell. Color coded to indicate blue for low, black within range and red for too high. Accordingly, a spread sheet may be downloaded from a desktop which may have further information such as, measurement location, design values, measurement tolerances, system identifications. Furthermore, once all measurements are completed, the data from the spread sheet format can be printed in whole or in part or may be delivered to other post-analytical systems and/or other electronic services (e.g., email or a cost-analysis software to determine energy consumption/heat losses).

Figure 12:
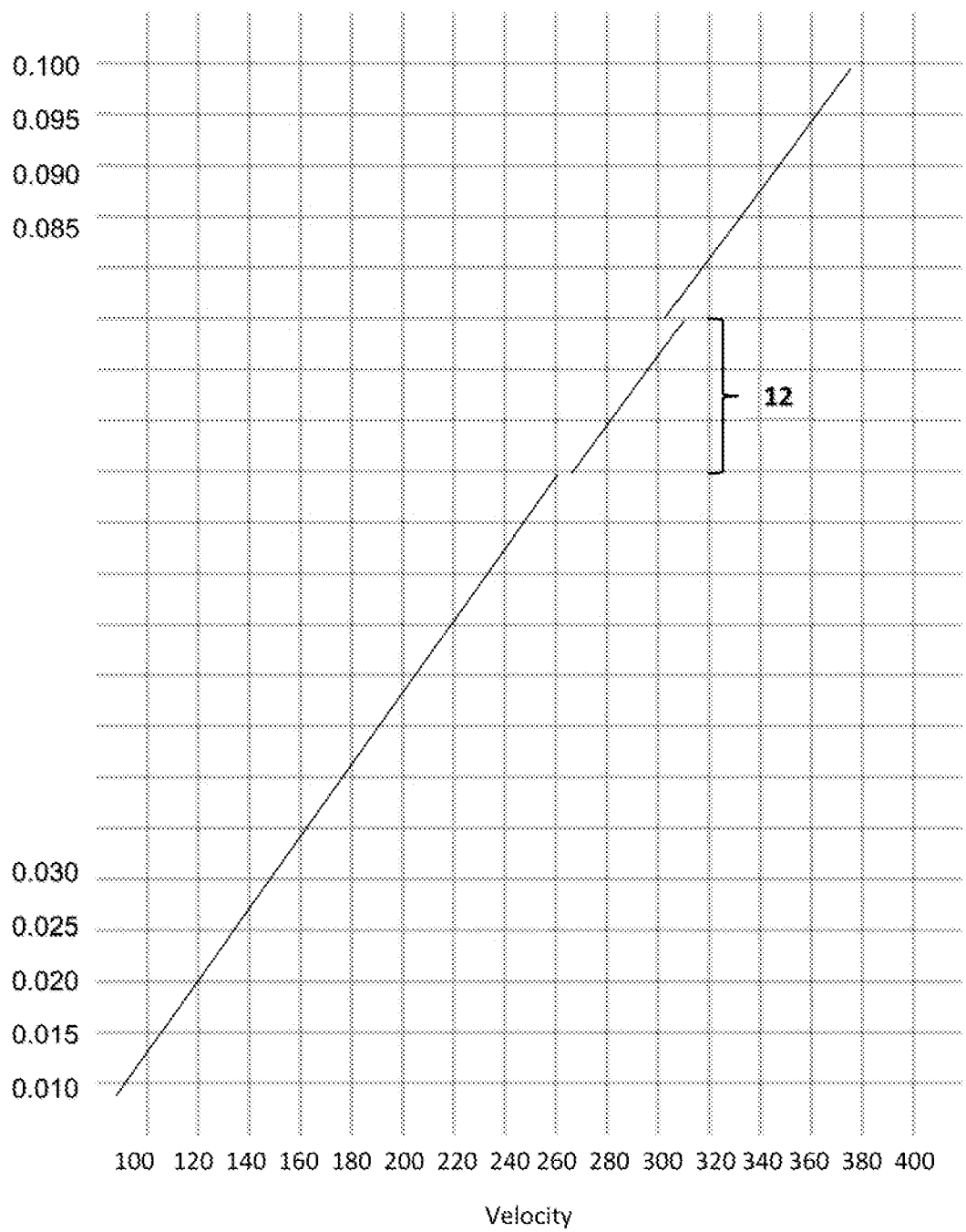
FIG. 12 illustrates a chart depicting test results using an embodiment of the disclosures herein.

According to the illustrative embodiment of FIG. 12, an exemplary chart of the type described with respect to the operational flow exemplified with respect to FIG. 11 may be shown. A device 77 of having a square cross section was situated under an air supply connected to the following duct system: (i) an 8 inch inner diameter corrugated duct bent at a 90 degree angle; (ii) an 8 inch inner diameter pipe connected to the corrugated duct; (iii) a variable speed fan connected upstream of the 8 inch inner diameter pipe; (iv) a 10 inch inner diameter pipe connected to the variable speed fan and terminating in a metering device, such as an orifice/venturi tube that is then connected to a differential pressure micro manometer; and (v) a 10 inch inner diameter pipe connected upstream of the metering device. In this exemplary test layout, the micro manometer is the same type used in the leveling hub 727 of the device 77. Measurements were taken over 10 diameters of 8 inch round pipe, 10 diameters of the first 10 inch inner diameter round pipe, and 20 diameters of the 10 inch round pipe upstream of the metering device. In total 25 different readings were obtained and charted in the graph depicted in FIG. 12.

The ordinate of the chart is a measure of differential pressure in terms of inches of water. The abscissa shows velocity in feet per minute read at the leveling hub of the device 77. As shown in the chart, the lower point of the discontinuity identified as numeral 12 is approximately 0.070 inches of water and its upper-most point is approximately 0.080 inches of water. In other words, the velocity measurements achieved using the teachings of the present disclosure were linearly precise save for a small region that existed between 0.070 and 0.080 inches of water. Those skilled in the art would understand that normal National Institute of Standards and Technology ("NIST") Certification requires only three (3) readings of velocity measures "across scale," namely a high-medium-low point on the scale of normal use of the fluid flow source. The chart of FIG. 12 exemplifies the failures of the prior art and the need for the instant disclosure.

Had a normal NIST Certification been used on device 77 and taking measurements "across scale," the discontinuity noted by numeral 12 in FIG. 12 may have been overlooked and the device deemed "certified." However, the discontinuity at 12 is a reality of all such systems that cannot be overlooked or else the measurements obtained by the device are either flawed or not calibrated for all points along the entire system. In the present case, the inventive disclosures result in a minimal discontinuity in the otherwise linear measuring of fluid flows from a source (approximately 90% accurate) without any corrective factors being applied. However, the system can iteratively obtain accuracy over the entire range or at set points in the measurements to enhance the accuracy of the reported results. Either a trend curve-fitting analysis can be done for the data received, such as the results in the chart of FIG. 12, or dynamic correction may be introduced into the system over a discrete range (e.g., a corrective factor for velocities between 240 feet per minute and 280 feet per minute based on the existence of the data plot numeral 12 in FIG. 12).

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A fluid-flow measuring apparatus, comprising:
an enclosure housing;
a tubular flow sensor that receives fluid flow through an aperture therein;
a hub intersecting the tubular flow sensor;
and a facilitator structure comprising:
a section interconnecting a first portion of the enclosure housing to a second portion of the enclosure housing opposite the first portion, and
two walls extending downwardly from the section, wherein the section and the two walls bound an area that is shielded from flow by the facilitator structure,
wherein the tubular flow sensor and the hub are each disposed outside of the area shielded by the facilitator structure.

2. The fluid-flow measuring apparatus of claim 1, further comprising at least one additional aperture in the tubular flow sensor.

3. The fluid-flow measuring apparatus of claim 1, further comprising a plurality of apertures in the tubular flow sensor disposed at a plurality of positions about the tubular flow sensor.

4. The fluid-flow measuring apparatus of claim 3, wherein the plurality of apertures in the tubular flow sensor faces the source of fluid flow.

5. The fluid-flow measuring apparatus of claim 1, further comprising: a plurality of flow-receiving tubes.

6. The fluid-flow measuring apparatus of claim 5, further comprising: a plurality of apertures in each of the plurality of flow-receiving tubes.

7. The fluid-flow measuring apparatus of claim 5, wherein a volume within the hub is greater than a total volume of fluid received from all apertures in each of the plurality tubular flow sensor.

8. The fluid-flow measuring apparatus of claim 5, wherein the section of the facilitator structure has the same cross-section for an equal length of each of the plurality of tubular flow sensors.

9. The fluid-flow measuring apparatus of claim 1, wherein a volume within the hub is greater than a total volume of fluid received from all apertures in each tubular flow sensor.

10. The fluid-flow measuring apparatus of claim 1, further comprising at least one plate oriented with respect to another opening within the hub.

11. The fluid-flow measuring apparatus of claim 10, further comprising at least two plates oriented with respect to one another and with respect to the opening within the hub.

12. The fluid-flow measuring apparatus of claim 11, wherein the at least two plates make a triangular orientation with respect to one another.

13. The fluid-flow measuring apparatus of claim 1, wherein the section of the facilitator structure has the same cross-section for a length of the tubular flow sensor.

14. The fluid-flow measuring apparatus of claim 1, further comprising a non-flat surface on the surface section of the facilitator structure.

15. The fluid-flow measuring apparatus of claim 14, wherein the non-flat surface comprises a dome or pyramidal structure.

16. The fluid-flow measuring apparatus of claim 15, wherein the section is frusto-pyramidal.

17. The fluid-flow measuring apparatus of claim 1, further comprising two or more of the following:
 (i) at least one additional aperture in the tubular flow sensor;
 (ii) a plurality of apertures in the tubular flow sensor disposed at a plurality of positions about the tubular flow sensor;
 (iii) the plurality of apertures in the tubular flow sensor faces the source of fluid flow;
 (iv) a plurality of flow-receiving tubes;
 (v) a volume within the hub is greater than a total volume of all apertures in each tubular flow sensor;
 (vi) at least one plate oriented with respect to another opening within the hub;
 (vii) at least two plates oriented with respect to one another and with respect to the opening within the hub;
 (viii) the at least two plates make a triangular orientation with respect to one another within the hub;
 (ix) a non-flat surface on the surface section of the facilitator structure;
 (x) the non-flat surface of the facilitator structure comprises a dome or pyramidal structure; and
 (xi) the facilitator structure is frusto-pyramidal in shape.

18. The fluid-flow measuring apparatus of claim 17, further comprising five or more of the following:
 (i) at least one additional aperture in the tubular flow sensor;
 (ii) a plurality of apertures in the tubular flow sensor disposed at a plurality of positions about the tubular flow sensor;
 (iii) the plurality of apertures in the tubular flow sensor faces the source of fluid flow;
 (iv) a plurality of flow-receiving tubes;
 (v) a volume within the hub is greater than a total volume of all apertures in each tubular flow sensor;
 (vi) at least one plate oriented with respect to another opening within the hub;
 (vii) at least two plates oriented with respect to one another and with respect to the opening within the hub;
 (viii) the at least two plates make a triangular orientation with respect to one another within the hub;
 (ix) a non-flat surface on the surface section of the facilitator structure;
 (x) the non-flat surface of the facilitator structure comprises a dome or pyramidal structure; and
 (xi) the facilitator structure is frusto-pyramidal in shape.

19. A fluid-flow measuring apparatus, comprising:
an enclosure housing;
a tubular flow sensor that receives fluid flow through an aperture therein;
a hub intersecting the tubular flow sensor, wherein the hub comprises at least one plate therein;
and a facilitator structure comprising:
 a section interconnecting a first portion of the enclosure housing to a second portion of the enclosure housing opposite the first portion,
wherein the tubular flow sensor and the hub are disposed outside of the facilitator structure and interconnected to the facilitator structure via a third portion of the enclosure housing.

20. The fluid-flow measuring apparatus of claim 19, further comprising three or more of the following:
 (i) at least one additional aperture in the tubular flow sensor;
 (ii) a plurality of apertures in the tubular flow sensor disposed at a plurality of positions about the tubular flow sensor;
 (iii) the plurality of apertures in the tubular flow sensor faces the source of fluid flow;
 (iv) a plurality of flow-receiving tubes;
 (v) a volume within the hub is greater than a total volume of all apertures in each tubular flow sensor;
 (vi) at least one plate oriented with respect to another opening within the hub;
 (vii) at least two plates oriented with respect to one another and with respect to the opening within the hub;
 (viii) the at least two plates make a triangular orientation with respect to one another within the hub;
 (ix) a non-flat surface on the surface section of the facilitator structure;
 (x) the non-flat surface of the facilitator structure comprises a dome or pyramidal structure; and
 (xi) the facilitator structure is frusto-pyramidal in shape.

* * * * *